(12) United States Patent
Engh-Halstvedt et al.

(10) Patent No.: US 11,189,073 B2
(45) Date of Patent: Nov. 30, 2021

(54) GRAPHICS PROCESSING

(71) Applicant: Arm Limited, Cambridge (GB)

(72) Inventors: Andreas Due Engh-Halstvedt, Trondheim (NO); Frank Klaeboe Langtind, Melhus (NO); Mark Underwood, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/825,346

(22) Filed: Mar. 20, 2020

(65) Prior Publication Data
US 2021/0295584 A1 Sep. 23, 2021

(51) Int. Cl.
*G06T 1/60* (2006.01)
*G06T 15/00* (2011.01)
*G06T 15/80* (2011.01)
*G06T 1/20* (2006.01)

(52) U.S. Cl.
CPC ............. *G06T 15/005* (2013.01); *G06T 1/20* (2013.01); *G06T 1/60* (2013.01); *G06T 15/80* (2013.01)

(58) Field of Classification Search
CPC .. G06T 1/20; G06T 1/60; G06T 15/50; G06T 15/80; G06T 17/00; G06T 2200/28; G06T 15/00; G06T 19/20; G06T 2200/04; G06T 2219/00; G09G 5/363
See application file for complete search history.

(56) References Cited

U.S. PATENT DOCUMENTS

| 10,255,718 B2 | 4/2019 | Langtind |
| 2003/0016217 A1 | 1/2003 | Vlachos |
| 2007/0146378 A1 | 6/2007 | Sorgard |
| 2009/0073177 A1 | 3/2009 | Jiao |
| 2010/0302246 A1 | 12/2010 | Jiao |
| 2012/0005557 A1 | 1/2012 | Mardiks |
| 2013/0046951 A1* | 2/2013 | Jones ............... G06F 12/023 711/171 |
| 2014/0089624 A1 | 3/2014 | Ffrench |
| 2017/0193691 A1 | 7/2017 | Langtind |
| 2018/0025463 A1 | 1/2018 | Kazakov |

(Continued)

FOREIGN PATENT DOCUMENTS

| CN | 106504183 | 3/2017 |
| GB | 2527822 | 1/2016 |

OTHER PUBLICATIONS

GB Combined Search and Examination Report dated Nov. 28, 2017, GB Patent Application GB1710873.9.

(Continued)

*Primary Examiner* — Hau H Nguyen

(74) *Attorney, Agent, or Firm* — Vierra Magen Marcus LLP

(57) ABSTRACT

A method of operating a graphics processor that executes a graphics processing pipeline comprising a vertex shading stage is disclosed. A set of blocks of memory space that may be represented by a linked list is provided and memory space for storing vertex shaded attribute data generated by the vertex shading stage is allocated from one of the blocks of memory space in the set of blocks of memory space. When data stored in a block of memory space is no longer needed by the graphics processing pipeline, the block can be "recycled" for use by the pipeline.

18 Claims, 16 Drawing Sheets

(56) References Cited

U.S. PATENT DOCUMENTS

2019/0012829 A1  1/2019  Engh-Halstvedt

OTHER PUBLICATIONS

GB Combined Search and Examination Report, dated Mar. 22, 2016, GB Patent Application No. GB1600144.8.
Office Action dated Mar. 22, 2018, U.S. Appl. No. 15/393,120.
Response to Office Action dated Sep. 19, 2018, U.S. Appl. No. 15/393,120.
Notice of Allowance dated Nov. 21, 2018, U.S. Appl. No. 15/393,120.
Office Action dated Sep. 12, 2019, U.S. Appl. No. 16/026,402.
Response to Office Action dated Dec. 10, 2019, U.S. Appl. No. 16/026,402.
Notice of Allowance dated Jan. 14, 2020, U.S. Appl. No. 16/026,402.

* cited by examiner

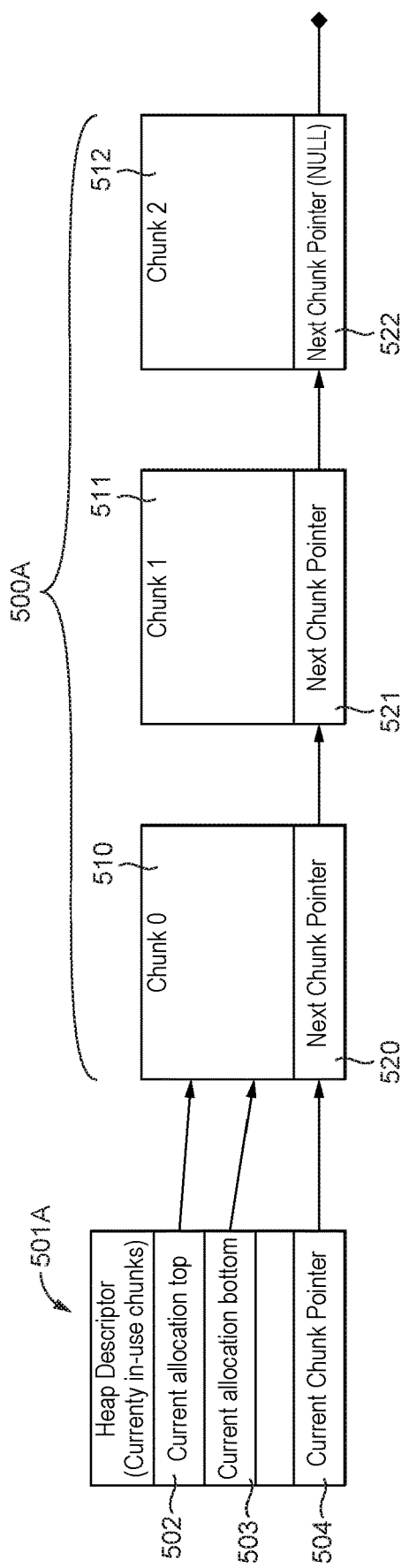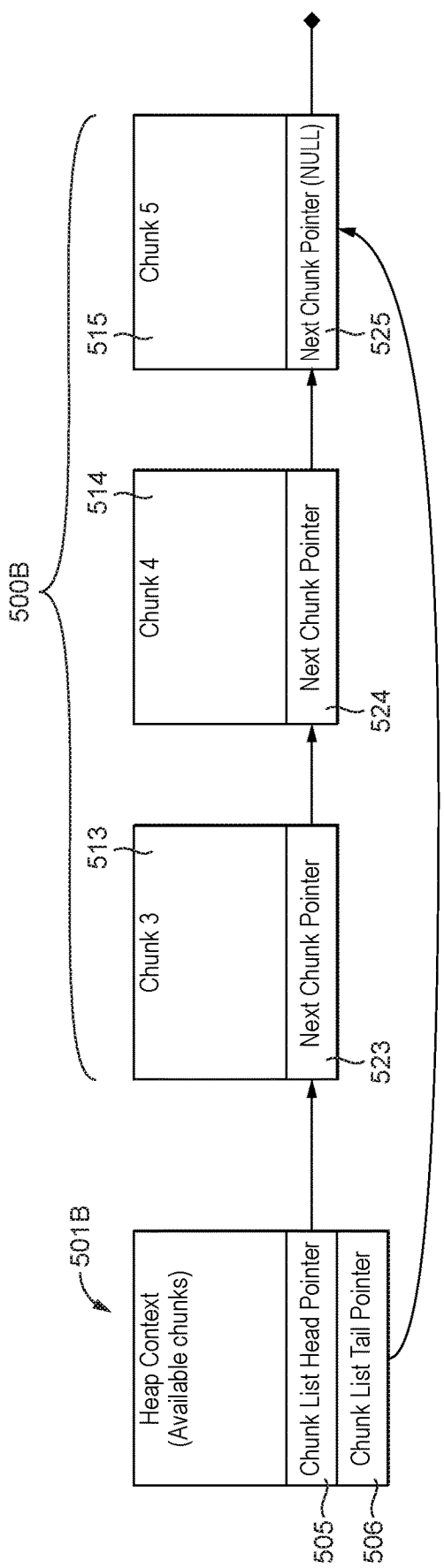
FIG. 5A
FIG. 5B

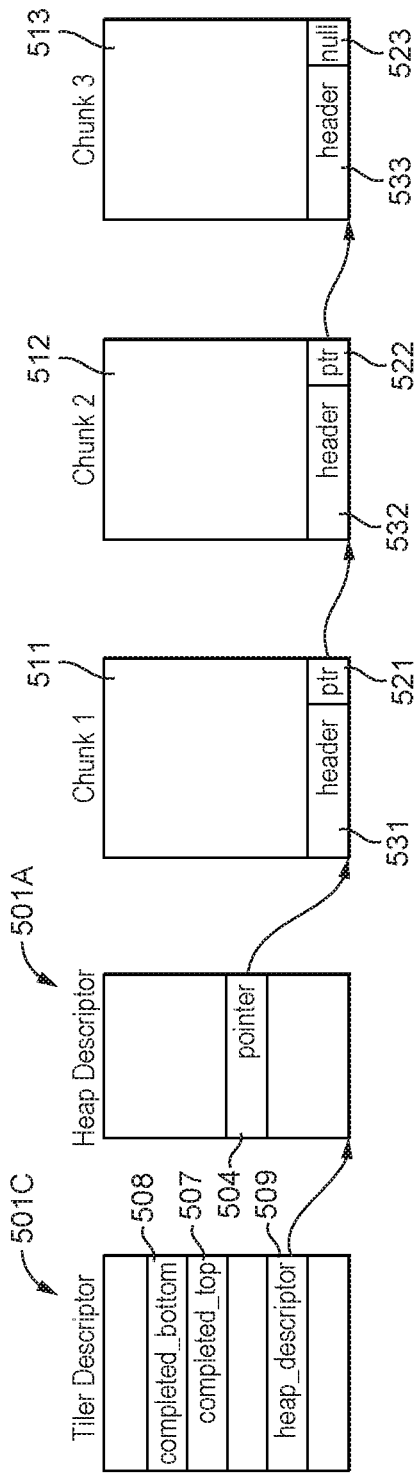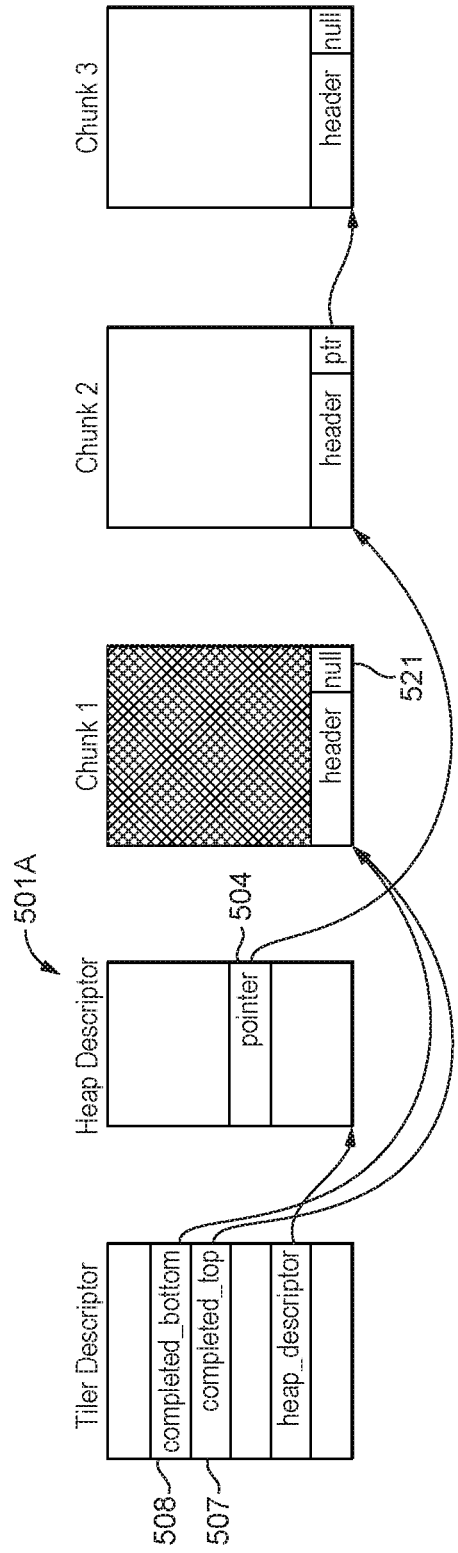
FIG. 9A
FIG. 9B

GRAPHICS PROCESSING

BACKGROUND

The technology described herein relates to graphics processing, and in particular to the operation of graphics processing pipelines that perform vertex shading.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

Each primitive is usually defined by and represented as a set of vertices, where each vertex typically has associated with it a set of "attributes", i.e. a set of data values for the vertex. These attributes will typically include position data and other, non-position data (varyings), e.g. defining colour, light, normal, texture coordinates, etc, for the vertex in question.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed by the graphics processing system, in order to generate the desired graphics processing output (render target), such as a frame for display. This basically involves rasterising and rendering the primitives to generate the graphics processing output.

The rasterising and rendering processes use the vertex attributes associated with the vertices of the primitives that are being processed. To facilitate this operation, the attributes of the vertices defined for the given graphics processing output (e.g. draw call) are usually subjected to an initial so-called "vertex shading" operation, before the primitives are rasterised and rendered. This "vertex shading" operation operates to transform the attributes for each vertex into a desired form for the subsequent graphics processing operations. This may comprise, for example, transforming vertex position attributes from the world or user space that they are initially defined for to the screen space that the output of the graphics processing system is to be displayed in.

A graphics processing pipeline will typically therefore include a vertex shading stage (a vertex shader) that executes vertex shading computations on the initial vertex attribute values defined for the vertices so as to generate a desired set of output vertex attributes (i.e. appropriately "shaded" attributes) for use in subsequent processing stages of the graphics processing pipeline.

Once the vertex attributes have been shaded, the "shaded" attributes are then used when processing the vertices (and the primitives to which they relate) in the remainder of the graphics processing pipeline.

(In general "input variables" and "output variables" are the generic terms used for inputs and outputs from shaders (shading stages) in graphics processing pipelines. Before being vertex shaded, a vertex is a collection of "generic vertex attributes" that can be accessed within the vertex shader as input variables. The vertex shader execution then produces a vertex position and any outputs explicitly written by the vertex shader. "Varyings" are the attributes communicated from the vertex shader to rasterisation and fragment shading, not including position. (Thus only the non-position outputs from the vertex shader are "varyings".))

One form of graphics processing pipeline is a so called tile-based graphics processing pipeline, wherein the two-dimensional render output is rendered as a plurality of smaller area sub-regions, usually referred to as "tiles". The tiles are each rendered separately (e.g., one after another). The rendered tiles are then combined to provide the complete render output (e.g. frame for display).

(Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.)

In a tile-based graphics processing pipeline, the geometry (primitives) for the render output being generated is sorted into respective regions of the render output. This primitive listing process identifies primitives that need to be processed for a given region of the render output (and thus rendering tile(s)) (so as to, e.g., avoid unnecessarily rendering primitives that are not actually present in a tile). The primitive listing process produces lists of primitives to be rendered for the render output regions. Then, once the primitive lists have been prepared for the render output regions, each rendering tile is processed, by rasterising and rendering the primitives listed for the region(s) that encompass the rendering tile.

The regions of the render output that primitive lists can be prepared for can correspond e.g. to single rendering tiles, or to sets of plural rendering tiles.

An important aspect of tile-based graphics processing therefore is the initial processing to generate the primitive lists for use to identify the primitives that need to be processed for the rendering tiles, which initial processing is then followed by the main rasterising and rendering passes for the tiles.

Thus, in a tile-based processing system there will be an initial processing pass which, in effect, sorts the graphics primitives (and/or other graphics entities) to be processed into regions that the render output is divided into for processing purposes. This initial processing pass is performed for all the geometry (primitives), etc., for the render output unit of processing (e.g. draw call) to be processed. The rasterising and rendering of the geometry (primitives) in the tiles to generate the render output is then done once the initial processing to sort the geometry, etc. into the regions has been completed.

Tile-based graphics processing pipelines can accordingly be thought of as (and referred to as) "deferred" graphics processing pipelines (graphics processors) (and to perform "deferred" rendering). This is because the rasterising and rendering pass is deferred until suitable lists of primitives to be processed have been prepared for each region that the render output has been divided into for processing purposes.

The Applicants have recognised that when performing deferred rendering as in the case of a tile-based graphics processing pipeline, it is desirable to retain (store) geometry data (and in particular vertex-shaded vertex data) that has been used for the initial primitive listing processing pass for use in the later deferred rasterising and rendering pass. This can then avoid, e.g., having to re-generate the vertex-shaded vertex data (to "re-shade" vertices) between the initial primitive listing processing pass and the later deferred rasterising and rendering pass.

However, this then means that there is a need to store geometry (and in particular vertex) data for a period of time for use in the later, deferred, rasterising and rendering pass. Accordingly, memory needs to be allocated to store this data so that it is available for the later deferred rasterising and rendering pass.

One way to do this would simply be to allocate the maximum amount of memory space that could possibly be required for all of the geometry (vertex) data (potentially) to be processed (e.g. based on the total number of vertices input by the application that requires the graphics processing). However, this can be inefficient in terms of the overall usage of memory in the data processing system that the graphics processing pipeline is part of (or, indeed, there may not be sufficient available memory space to set aside for all of the (potentially) required data). It can also be a relatively complex task to determine how much memory space should be allocated.

It would also be possible to use more complex analysis of the likely memory storage requirements so as to try to achieve more efficient allocation of memory for this purpose, but this can lead to increased driver complexity and operations (and/or may require some or all of the "memory allocation" operations to be performed on the graphics processor itself).

An improved method for allocating memory in a tile based graphics processing pipelines that employ vertex shading has already been proposed by the Applicants in their patent application US 2019/0012829, the entire contents of which are hereby incorporated by reference.

However, the Applicants believe that there remains scope for improvements to, in particular tile-based, graphics processing pipelines that employ vertex shading.

BRIEF DESCRIPTION OF THE DRAWINGS

Embodiments of the technology described herein will now be described by way of example only and with reference to the accompanying drawings, in which:

FIGS. 5A-C schematically illustrates linked lists of memory space chunks in embodiments of the technology described herein;

FIGS. 9A-E illustrates the use of the linked lists of FIG. 5, according to an embodiment of the technology described herein.

Like reference numerals are used for like components in the Figures, where appropriate.

DETAILED DESCRIPTION

Figure 1:
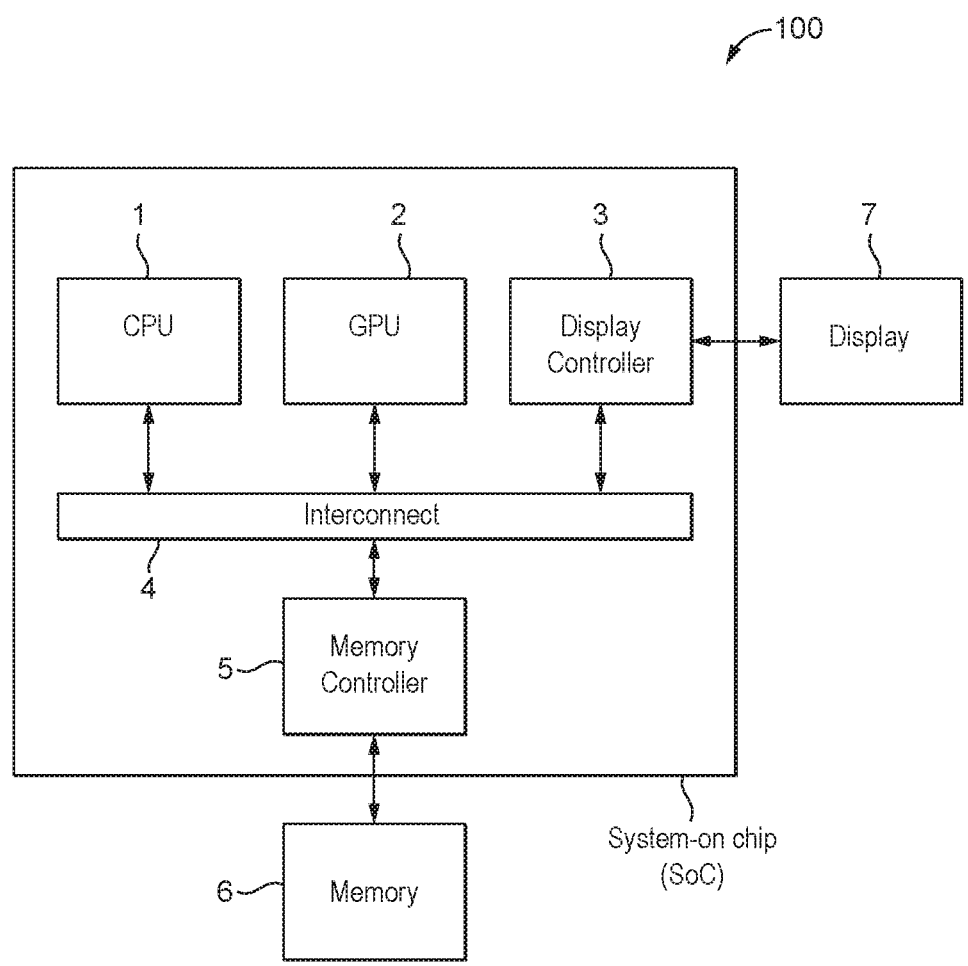
FIG. 1 shows a graphics processing system which can be operated in accordance with an embodiment of the technology described herein.

A first embodiment of the technology described herein comprises a method of operating a graphics processor that executes a graphics processing pipeline comprising a vertex shading stage that is operable to perform vertex shading operations on vertices to generate vertex shaded attribute data for vertex attributes of the vertices, the method comprising:

providing a set of blocks of memory space for storing vertex shaded attribute data generated by the vertex shading stage;

the vertex shading stage performing a vertex shading operation on one or more vertices to generate vertex shaded attribute data for at least one attribute of the one or more vertices;

allocating memory space for storing the vertex shaded attribute data from one of the blocks of memory space in the set of blocks of memory space; and storing the vertex shaded attribute data in the memory space allocated from the block of memory space in the set of blocks of memory space.

A second embodiment of the technology described herein comprises a graphics processing system comprising:

a graphics processor comprising a vertex shading circuit operable to perform a vertex shading operation on one or more vertices to generate vertex shaded attribute data for at least one attribute of the one or more vertices; and a memory space allocation circuit configured to:

allocate memory space for storing vertex shaded attribute data generated by the vertex shading circuit from a block of memory space in a set of blocks of memory space provided to the memory space allocation circuit; and to:

store vertex shaded attribute data generated by the vertex shading circuit in the allocated memory space from the block of memory space in the set of blocks of memory space.

The technology described herein relates to allocating memory space for storing vertex shaded attribute data generated by a graphics processor and processing pipeline. As discussed above, such vertex data may be generated and stored by a graphics processing pipeline for use in a later, e.g., deferred rasterising and rendering (fragment processing) pass in order to generate (render) a desired graphics output, e.g. a frame for display.

In the technology described herein, rather than there being a single pool (heap) of contiguous memory addresses from which memory space can be allocated to store the vertex data that is needed to generate a graphics output (e.g. frame for display), the pool (heap) of memory space from which memory space (addresses) can be allocated is provided in the form of a collection of independent blocks ("chunks") of memory space which are provided together as a set of memory space blocks, e.g. such that blocks of memory space within the set can be handled together as single entity. Thus, rather than having to set aside a single large set of contiguous memory addresses for storing vertex data for a graphics output (e.g. frame for display), plural smaller blocks of contiguous memory addresses that are, e.g., spread around in memory can be, and are, provided and combined together into a single set to provide the memory space pool (heap) for storing vertex data for a graphics output (e.g. frame for display).

As will be discussed further below, this can facilitate simpler and more flexible memory management. For example, by adding or removing blocks of memory space from the set of blocks of memory space, the size of the pool (heap) of memory space for storing vertex data for a graphics output (e.g. frame for display) can be increased or decreased in a straightforward manner. This can improve the handling of "out-of-memory" situations, and moreover, can allow the size of the overall pool (heap) of memory space to be dynamically adjusted in response to the actual amount of memory space that is being used for a graphics output (e.g. frame for display). Thus, the memory footprint for storing vertex data can be better tailored to the actual requirements of the graphics processing being performed.

Furthermore, in the technology described herein, blocks of memory space can be freed for re-use independently of other blocks of memory space. This means that a block of memory addresses that was previously used in generating (rendering) a previous graphics output (e.g. frame for display) can be re-used for the next graphics output (e.g. frame for display) to be generated (rendered). As will be discussed further below, this can facilitate particularly efficient arrangements whereby blocks of memory addresses are, in effect, "re-circulated" for re-use over multiple graphics outputs (e.g. frames), leading to an overall reduction in the processing requirements and memory footprint for storing vertex data, e.g. as compared to arrangements in which an entirely new pool (heap) of memory space is set aside for storing vertex data when a new graphics output (e.g. frame for display) is to be generated (rendered).

The technology described herein can accordingly reduce the processing requirements and memory footprint of a graphics processing pipeline that employs vertex shading. The technology described herein is generally advantageous, but may be particularly advantageous in contexts where vertex data memory storage requirements may be difficult to predict in advance, and/or in arrangements in which vertex data memory allocation is performed "conditionally" and "on demand", e.g. as described in US 2019/0012829.

It will be appreciated, therefore, that the technology described herein provides an improved graphics processing system.

The graphics processor (and system) of the technology described herein can be any suitable and desired processor (and system) which is operable to generate a useful graphics output. Thus, the graphics processor should, and in an embodiment does, generate a graphics output (render output) using the stored vertex data.

The graphics output to be generated (using the stored vertex data) may comprise any suitable render output, such as frame for display, or render-to-texture output, etc. In an embodiment, the graphics output is an output frame in a sequence of plural output frames (to be displayed) that the graphics processor (and system) generates.

The graphics processor (graphics processing unit (GPU)) executes a graphics processing pipeline. The graphics processor can execute any suitable and desired graphics processing pipeline, and may and in an embodiment does, include any suitable and desired processing circuits, processing logic, components and elements for that purpose. In an embodiment, the graphics processor (GPU) is configured by firmware running on the graphics processor (GPU) to execute the graphics processing pipeline.

The graphics processor and graphics processing pipeline may be, and in an embodiment are, a tile-based graphics processor and processing pipeline operable to generate tiles of an overall graphics output, e.g. frame.

The graphics processing pipeline that the graphics processor of the technology described herein executes can include any suitable and desired processing stages for generating a (the) graphics output (e.g. frame). Thus, the graphics processing pipeline can include, and in an embodiment does include, in addition to the vertex shading stage, any one or one or more, and in an embodiment all, of the other processing stages that graphics processing pipelines normally include. Thus, for example, the graphics processing pipeline in an embodiment also includes a primitive setup stage, a rasteriser and a renderer. In an embodiment the renderer is in the form of or includes a fragment shader.

Thus, in an embodiment, the graphics processing pipeline (processor) comprises a fragment shading stage (circuit) which uses the stored vertex data generated by the vertex shading stage (circuit) to generate (render) a desired graphics output, e.g. a frame for display.

The graphics processing pipeline may also contain any other suitable and desired processing stages that a graphics processing pipeline may contain such as a depth (or depth and stencil) tester, a blender, etc. Where the pipeline is a tile-based pipeline, the pipeline in an embodiment also comprises a tiling stage, and/or a tile buffer for storing tile sample values and/or a write out unit that operates to write the data in the tile buffer (e.g. once the data in the tile buffer is complete) out to external (main) memory (e.g. to a frame buffer).

A (and each) processing stage (circuit) of the graphics processing pipeline (processor) can be implemented as desired, e.g. as a fixed function hardware unit (circuit) or as a programmable processing circuit (that is programmed to perform the desired operation). In an embodiment, at least the vertex shading stage and/or the fragment shading stage are implemented by a programmable execution unit (shader core) of the graphics processor executing an appropriate shader (program) that is in an embodiment supplied by the application that requires the graphics processing.

The graphics processing system can include any (other) suitable and desired components. In an embodiment, the graphics processing system includes a host processor which is operable to issue graphics processing commands (and data) to the graphics processor (GPU). In an embodiment, the firmware running on the graphics processor (GPU) is operable to configure the graphics processor (GPU) in accordance with commands (and data) received from the host processor.

Thus, the graphics processing pipeline is in an embodiment executed (by the graphics processor (GPU)) in response to commands issued by a host processor of the graphics processing system. The host processor can be any suitable and desired processor, such as and in an embodiment a central processing unit (CPU), of the graphics processing system.

In an embodiment, the host processor of the graphics processing system generates the graphics processing commands (and data) for the graphics processor (GPU) in response to instructions from an application executing on the host processor. This is in an embodiment done by a driver for the graphics processor (GPU) that is executing on the host processor.

The graphics processing system should, and in an embodiment does, (further) comprise a memory. The memory can be any suitable and desired storage. The memory may be an on-chip memory (i.e. on the same chip as the host processor and/or the graphics processor) or it may be an external (main) memory (i.e. not on the same chip as the host processor and/or the graphics processor). Where the memory is an external memory, it may be connected to the host processor and/or to the graphics processor by a suitable interconnect.

A (each) block of memory space can comprise any memory space suitable for storing (at least) vertex data. The memory space is in an embodiment memory space in the (main) memory of the graphics processing system. Thus, there is in an embodiment an allocated set of plural blocks of memory space that together form a memory space pool (a "heap") in the memory of the graphics processing system that is set aside for use by the graphics processing pipeline for storing (at least) vertex data.

A (each) memory space block (a "chunk") should, and in an embodiment does, comprise a set of contiguous (virtual) memory addresses (in the virtual (logical) memory address space), that should, and in an embodiment does, start from (i.e. have) a lowest (bottom) memory address and extend to a highest (top) memory address. Thus, a (each) memory space block should, and in an embodiment does, comprise a set of contiguous virtual memory addresses. The virtual memory addresses for a memory space block will be, and are in an embodiment, associated with a corresponding set of physical memory addresses, which set of (physical) memory addresses are also in an embodiment contiguous, but need not be contiguous, memory addresses (in the physical memory address space). Thus, a (the) set of blocks of memory space in an embodiment comprises plural blocks of memory space, each block of memory space comprising a contiguous set of memory addresses.

A (each) memory space block should be independent of each other block of memory space, and thus should comprise an independent section of memory space. Thus, different memory space blocks can be distributed in the memory address space as suitable and desired.

In an embodiment, there is at least one memory space block which is not contiguous with any other memory space blocks (in a (the) set), i.e. there is at least one memory space block whose lowest memory address is not preceded by, and whose highest memory address is not followed by, a memory address of another memory space block (in a (the) set). All of the memory space blocks could be non-contiguous memory space blocks, or there may be a combination of contiguous and non-contiguous memory space blocks in a (the) set, as desired. Thus, two or more memory space blocks (in a (the) set) may be contiguous with each other, i.e. the lowest memory address of a memory space block may be the memory address following the highest memory address of another memory space block.

A (each) memory space block can be any suitable and desired size (i.e. can comprise any suitable and desired number of memory addresses). There may be memory space blocks having different sizes (in a (the) set). However, in an embodiment, each memory space block (in a (the) set) is the same (fixed) size (encompassing the same range of memory addresses) as each other memory space block (in the set). For example, a (each) memory space block may be about 2 MB in size.

The size of a (each) memory space block may be selected based on an amount of data that the set is expected to store, e.g. and in an embodiment, for a graphics output (e.g. frame) that the graphics processing pipeline is generating. Thus, for example and in an embodiment, a larger memory space block size may be used when generating a more memory intensive (e.g. complex) render output than when generating a less memory intensive (complex) render output.

Where a (each) memory space block comprises the same or larger amount of memory space than is needed to store data for a render output (e.g. frame), then the data for a render output (e.g. frame) may be stored in a single memory space block. Moreover, data for plural different render outputs (e.g. frames) can be, and in an embodiment is, stored in the same single memory space block. Where, however, a (each) memory space block comprises a smaller amount of memory space than is needed to store data for a render output (e.g. frame), then the data for a single render output (e.g. frame) can be, and in an embodiment is, stored in multiple different memory space blocks (within a (the) set).

A (the) set of blocks of memory space should thus be, and in an embodiment is, provided such that memory space blocks within the set can appear, and be treated together, as a single pool (heap) of memory space for storing (at least) vertex data. Thus, memory space blocks within a (the) set should be, and in an embodiment are, associated with each other ("tied together"), such that they can be handled together as a single entity.

This can be achieved as desired. In an embodiment, a particular, in an embodiment selected, in an embodiment predetermined, organisational structure (e.g. data structure) representing a (the) set of blocks of memory space is provided, with memory space blocks of the set being represented by respective elements of the structure. For example, a tree representation could be provided, with nodes of the tree representation representing memory space blocks of the set of blocks of memory space.

In an embodiment, the memory space blocks within a (the) set are arranged in a particular sequence, which, as will be discussed further below, in an embodiment represents the order in which the memory space blocks in the set will be (and are) used by the graphics processing pipeline. In this case, in an embodiment, a list of memory space blocks representing the set of blocks of memory space is provided, which list indicates the memory space blocks within the set, and the order in which the memory space blocks are arranged within the set.

In one such embodiment, a linked list representing a (the) set of blocks of memory space is provided, with each element of the linked list representing a respective memory space block of the set of blocks of memory space. Thus, in an embodiment, a linked list of one or more blocks of memory space is provided, and memory space is allocated from one of the blocks of memory space in the linked list of one or more blocks of memory space. The inventors have found that a linked list can facilitate particularly efficient organisation of memory space blocks.

Each memory space block in a (the) linked list should be (and in an embodiment is) associated with a respective sequence indicating link (reference) which can indicate an adjacent, e.g. the next (or previous), memory space block in the list sequence, or can indicate that the respective memory space block is an end, e.g. the last (or first), memory space block in the list sequence.

A sequence indicating link (reference) for a memory space block can be provided as desired. In an embodiment, a sequence indicating link for a (each) memory space block comprises a pointer which in an embodiment points to a (e.g., and in an embodiment the lowest or highest) memory address in another memory space block to indicate that the another memory space block is an adjacent, e.g. the next, memory space block in a sequence, or which in an embodiment does not point to another memory space block (is in an embodiment "null") to indicate that the associated memory space block is an end, e.g. the last, memory space block in a sequence.

The sequence of memory space blocks in a (the) (linked) list can be any suitable and desired order. The sequence of memory space blocks could follow a "memory address order", e.g. such that the memory addresses of a (each) memory space block are (all) higher than (or lower than) the memory addresses of any preceding memory space blocks in the sequence, or the sequence could jump from block to block in an order which does not correspond to "memory address order".

All of the (contiguous) memory addresses of a (each) memory space block could all be available to be allocated for storing vertex data (at least) for later use. However, in an embodiment, some of the memory addresses of a (and in an embodiment of each) memory space block are used for storing metadata associated with the memory space block (and as such, these memory address are not available for storing vertex data). Thus, a (and in an embodiment each) memory space block (in a (the) set) in an embodiment comprises memory space (addresses) for storing metadata (as well as memory space (addresses) for storing vertex data (at least)).

The (contiguous) memory addresses in a memory space block can be divided between memory addresses for storing metadata and memory addresses for storing vertex data (at least) in any suitable and desired manner. In an embodiment, there is a contiguous sub-set of memory addresses in a (each) memory space block that are used for storing metadata, e.g. and in an embodiment, at the top and/or bottom of the memory space block (and a contiguous sub-set set of memory addresses for storing (at least) vertex data). Thus, a (each) memory space block in an embodiment comprises a "header" and/or "footer" comprising metadata for the (respective) memory space block.

The metadata (e.g., header) in a (each) memory space block may comprise any suitable and desired information. For example, the metadata (e.g. header) in a (each) memory space block in an embodiment comprises information relating to an (the) organisational structure that the block is arranged within, e.g. and in an embodiment, in the case of a linked list, a (the) sequence indicating link (e.g. pointer) for the memory space block, e.g. as described above.

Additionally or alternatively, the metadata may comprise information indicating properties of a memory space block, such as the respective memory space block and/or an adjacent (e.g. next) memory space block (e.g. the memory space block indicated by the sequence indicating link (e.g. pointer)).

The properties of a memory space block indicated by the (header) information may comprise, e.g., information indicating the size of the memory space block, and/or the (range of) memory addresses in the memory space block (that are available to be allocated) for storing (at least) vertex data.

For example, the (header) information could comprise a pointer indicating the lowest memory address of a contiguous sub-set of memory addresses of a memory space block for storing (at least) vertex data and a pointer indicating the highest memory address of the contiguous sub-set of memory addresses of the memory space block for storing (at least) vertex data.

In an embodiment, the (header) information comprises information indicating the overall size of a memory space block. In this case, a lowest and a highest memory address for storing (at least) vertex data for the memory space block in question may be calculated based on the indicated memory space block size.

For example, in an embodiment, where a set of blocks of memory space is represented by a linked list, a (each) memory space block in the set comprises metadata (e.g., header) comprising a sequence indicating link (e.g. pointer) indicating an adjacent (e.g. next) memory space block in the set, and information indicating the overall size of the adjacent (e.g. next) memory space block in the set. A lowest and highest memory address for the adjacent (e.g. next) memory space block may then be calculated using the sequence indicating link (e.g. pointer), the indicated size, and e.g. the known size and location of the metadata (e.g., header) for the adjacent (e.g. next) memory space block.

The metadata may additionally or alternatively comprise data for any other desired purpose, such as for software tracking and/or debugging.

A (each) memory space block can be provided (to the memory space allocation circuit) as desired. In an embodiment, a (each) memory space block is initially set aside (in the memory) for use by the graphics processing pipeline for storing vertex data (at least). In an embodiment, this is done by the (driver running on the) host processor of the graphics processing system.

One or more initially set aside memory space blocks can then be grouped together to form a (the) set of blocks of memory space from which memory space is allocated. For example and in an embodiment, one or more initially set aside memory space blocks may be linked together into a linked list, in an embodiment by setting the sequence indicating link (e.g. pointer) for each memory space block in the linked list appropriately.

A (the) set of blocks of memory space can comprise any suitable number of memory space blocks. As will be discussed further below, the number of memory space blocks in the set may change with time, e.g. and in an embodiment, in response to a need for more (or less) memory space. However, the set should be initially (i.e. before the vertex shading stage (circuit) generates any vertex data that is to be stored in the set) provided with an initial number of memory space blocks.

The initial number of memory space blocks in the set can be selected as desired. For example, in one embodiment, zero blocks of memory space are initially included in the set. In this case, (the) one or more (plural) blocks of memory space should then be (and in an embodiment are) added to the set, e.g. and in an embodiment in response to a need for more memory (after the vertex shading stage (circuit) has generated vertex data that is to be stored in the set), e.g. and in an embodiment as will be discussed further below.

In an embodiment, however, (the) one or more (plural) blocks of memory space are initially included (by the host processor) in the set (before the vertex shading stage (circuit) generates any vertex data that is to be stored in the set).

In an embodiment, the number of memory space blocks initially included in the set is selected based on an amount of data that the set is expected to store, e.g. and in an embodiment, for a graphics output (e.g. frame) that the graphics processing pipeline is generating.

Thus, in an embodiment, providing the set of blocks of memory space comprises selecting a number of memory space blocks to initially include in the set based on an amount of data that the set is expected to store, and initially including the selected number of memory space blocks in the set.

The expected amount of memory space can be determined in any suitable and desired manner, for example based on a historic analysis (benchmarking) of different graphics processing outputs.

In an embodiment, the initially included memory space block(s) in the set comprise a smaller amount of memory space than is expected to be required for a graphics output (frame).

In this regard, the Applicants have recognised that since in the technology described herein, additional memory space can be provided in a straightforward manner by adding memory space blocks to the set, the technology described herein can tolerate a smaller amount of memory space being initially provided, e.g. as compared to less flexible memory arrangements in which adding more memory space can be more complex. By initially providing a relatively small amount of memory space, and then increasing the available memory space (only) if additional memory proves to be required, the technology described herein can facilitate the more efficient use of memory for storing vertex data in deferred (e.g. tile-based) rendering systems.

Once a set of blocks of memory space has been (initially) provided, memory space in a memory space block in the set can then be (and is) allocated (by the memory space allocation circuit) for storing vertex shaded attribute data.

The memory space allocation circuit is in an embodiment a hardware unit of the graphics processing system. The memory space allocation circuit may be external to the graphics processor, but is in an embodiment local to (part of) the graphics processor.

Memory space (for a vertex or group of vertices) can be allocated (by the memory space allocation circuit) in any suitable and desired manner, for example in the normal manner for memory space allocation requests in the graphics processing system in question.

In an embodiment, memory space is allocated (by the memory space allocation circuit) from a memory space block in response to a suitable request for memory space to be allocated, e.g. and in an embodiment, as discussed in US 2019/0012829.

As discussed above, memory space blocks in a (the) set are in an embodiment arranged in a (logical) order in which the memory space blocks should be (and are) used by the graphics processing pipeline (for a graphics output (e.g. frame)). Thus, the memory space block in the set from which memory space should be allocated to store (vertex) data is in an embodiment the first (next) memory space block in the list sequence which has (sufficient) memory space available to store the data.

Thus, the memory space allocation circuit (in response to a request to allocate memory space for (vertex) data) in an embodiment allocates memory space for storing the data from the first memory space block in the list sequence that has (sufficient) memory space available to store the (vertex) data.

This can be achieved as desired. For example, the memory space allocation circuit could, when allocating memory space, search through the list to find the next memory space block having available memory space. However, the Applicants have recognised that such arrangements could introduce an undesirable lag, e.g. particularly where the next memory space block having available memory space is towards the end of a relatively long list, such that the memory space allocation circuit then needs to search through a relatively large amount of memory space to find the memory space block to use.

Thus, in an embodiment, information indicating a (the "current") memory space block in the set (list) that the memory space allocation circuit should (attempt to) allocate memory space from is maintained (and stored). The memory space allocation circuit then in an embodiment (attempts to) allocates memory space from the (current) memory space block indicated by the (current) memory space block indicating information. This then avoids the need (for the memory space allocation circuit) to e.g. search through a list to find the memory space block to use.

The (current) memory space block indicating information can be provided in any suitable form. In an embodiment, the (current) memory space block indicating information is in the form of (a descriptor comprising) a pointer indicating (pointing to) (e.g. the top or bottom memory address of) the (current) memory space block in the set (list) that memory space should be (attempted to be) allocated from.

Once it has been established which memory space block in the set (list) (is the "current" memory space block) from which memory space should be (attempted to be) allocated (for storing the vertex data), then memory space (for storing the vertex data) should be (attempted to be) allocated from that memory space block.

Memory space allocation within a (e.g., the current) memory space block can be as desired. The memory space of a (each) memory space block could be used specifically for storing vertex shaded attribute data (only), but in an embodiment the memory space of a (each) memory space block is used for storing vertex shaded attribute data and other data, e.g. and in an embodiment, primitive lists.

Thus, the graphics processing pipeline is in an embodiment a tile-based graphics processing pipeline, and a (and in an embodiment each) memory space block (in a (the) set (list)) is in an embodiment used for storing both primitive lists and vertex shaded attribute data (for a graphics output (e.g. frame)).

Where memory space blocks store both primitive lists and vertex shaded attribute data, then these two types of data could be interleaved in a (each) memory space block, i.e. such that both types of data are stored at the next available space starting from one end of a memory space block (and in one embodiment this is what is done). However, in an embodiment, the primitive lists and the vertices (the vertex shaded attribute data) are stored progressively from respective opposite ends of a memory space block.

Thus, in an embodiment, primitive lists are allocated memory space and stored from one end of a memory space block, and the vertices are allocated memory space and stored from the other end of the (same) memory space block.

In an embodiment, the primitive lists are allocated and stored from the top of a memory space block and downward (i.e. starting at and from the highest memory address in the memory space block), and the vertices are allocated memory space and stored from the bottom up of the memory space block (i.e. starting at and from the lowest address of the memory space block). This has the advantage that the vertices can be stored used contiguous and increasing memory addresses.

These arrangements can be achieved as desired. In an embodiment, information indicating the next available memory address from the top and/or bottom of the current memory space block is maintained (and stored), e.g. and in an embodiment in the form of a pointer pointing to the top available memory address, and/or a pointer pointing to the bottom available memory address.

In an embodiment, this top and/or bottom available memory address indicating information initially indicates the top and/or bottom memory address of the memory space block, and is updated as memory space is allocated from the memory space block. The memory space allocation circuit then uses this top and/or bottom available memory address indicating information to determine where to begin allocating memory space from.

In an embodiment, the allocation of memory space within a memory space block to vertices is performed by first allocating a sub-block of memory space from the memory space block that is sufficient to store vertex shaded attribute data for plural vertices (and so can be thought of as being a "vertex packet"), and then allocating space within that sub-block ("vertex packet") in the memory space block to individual vertices, until the sub-block ("vertex packet") is full (at which point, if there is still space in the memory space block, a further sub-block ("vertex packet") is allocated and then progressively filled with vertices, and so on, until there is no more space in the memory space block for a complete "vertex packet"). Thus, once one vertex packet is full, a new vertex packet is in an embodiment allocated (if there is space in the memory space block for that), and so on.

Each sub-block (vertex packet) should be and is in an embodiment the same size, and is in an embodiment configured to always be an integer number of cache lines (e.g. an integer number of 64-byte cache lines), no matter the size of the vertex attributes. This means that the start of each new block (vertex packet) will be cache-line aligned.

In an embodiment, a (each) sub-block (vertex packet) is arranged as described in US 2019/0012829.

Where sufficient memory space is available in the "current" memory space block, then memory space can be, and in an embodiment is, allocated from the current memory space block accordingly. However, depending on the amount of memory space that has already been allocated from the current memory space block, the overall size of the current memory space block, and the amount of data that is to be stored, it may be the case that the current memory space block does not have sufficient available memory space available for storing the (vertex) data. A check is therefore in an embodiment performed (by the memory space allocation circuit) to determine whether the current memory space block has sufficient memory space available.

Thus, (the memory space allocation circuit) allocating memory space for storing (the vertex shaded attribute) data from one of the blocks of memory space in the set of blocks of memory space in an embodiment comprises: determining whether a (the) current block of memory space in the set (list) has sufficient memory space available to store the (vertex shaded attribute) data; and when it is determined that the current block of memory space has sufficient memory space available to store the (vertex shaded attribute) data, allocating memory space for storing the (vertex shaded attribute) data from the current block of memory space in the set (list).

Determining whether a (the) current memory space block has sufficient memory space available to store the (vertex and/or primitive) data can be performed as desired, for example in accordance with the memory overflow mechanisms that are otherwise used in the graphics processing system that the graphics processor is part of.

In the case where the primitive lists and the vertices share the same memory space block, and the primitive lists and vertices are allocated and stored from respective opposite ends of the memory space block, it can readily be (and in an embodiment is) determined when the memory space block has been used up (when there is insufficient free space in the memory space block for further data), by identifying when the primitive list and vertices allocations meet in the memory space block (start to overlap). This is therefore a further advantage of this arrangement.

Thus, in an embodiment, the top and/or bottom available memory address indicating information (e.g. pointers) is used to determine when a (the current) memory space block does not have sufficient memory space available to store the (vertex and/or primitive) data.

When it is determined that the current block of memory space does not have sufficient memory space available to store the (vertex shaded attribute) data, then memory space for storing the (vertex shaded attribute) data is in an embodiment (attempted to be) allocated from another memory space in the set. Where memory space blocks are arranged in a list, memory space for storing the (vertex shaded attribute) data is in an embodiment (attempted to be) allocated from a next block of memory space in the list (a memory space block (immediately) following the current memory space block in the list).

This then means that as data (for a graphics output (e.g. frame)) is generated and stored, blocks of memory space in the set (list) should be, and in an embodiment are, sequentially filled with data (exhausted), in an embodiment in the order (sequence) in which the memory space blocks are arranged in a (the) list. Thus, for example, a first memory space block (in the list) should first be filled with data (exhausted), before the next memory space block (in the list) is filled with data (exhausted), and so on.

This sequential filling of memory space blocks can be achieved as desired. In an embodiment, the (current) memory space block indicating information (pointer) initially indicates (points to) a (the) first memory space block (in the list). Then, once a (the current) memory space block has been filled with data (exhausted) (when it is determined that a (the) current memory space block does not have enough memory space available to store (the) data), the (current) memory space block indicating information (pointer) is updated to indicate (point to) the next memory space block (in the list) (and so on). This will then cause memory space blocks in the set to be filled (by the memory space allocation circuit) in sequence.

The another (e.g. next) memory space block in the set (list) (from which memory space is (attempted to be) allocated from when it is determined that the current memory space block does not have enough memory space available to store the data) could be, and is in an embodiment, a memory space block that is already present in the set (list), e.g., due to it being initially included in the set (list) (or otherwise added to the set (list) at a later point in time).

However, it could be the case that the set (list) does not (already) include a memory space block which can store the data. A check is therefore in an embodiment performed (by the memory space allocation circuit) to determine if there is a memory space block (already) in the set (list) that can store the data.

Where memory space blocks are arranged in (represented by) a list, this can be, and in an embodiment is, done by determining whether the current block of memory space is the last block of memory space in the list. For example, in linked list embodiments where a sequence indicating link comprising a pointer is provided, it may be determined that the current block of memory space is the last block of memory space in the linked list (and that therefore there is not another memory space block (already) in the set that can store the data) when then pointer for the "current" memory space block does not point to another memory space block (is "null").

If it is determined (by the memory space allocation circuit) that there is not another memory space block (already) in the set that can store the data (if it is determined that the current block of memory space is the last block of memory space in the (linked) list), then a block (or blocks) of memory space is in an embodiment added to the set (e.g., and in an embodiment, at the end of the (linked) list) to thereby provide a new (the next) block(s) of memory space in the set (list) (and memory space for storing the (vertex shaded attribute) data is in an embodiment allocated from the (first) added block of memory space).

This then means that should the memory space in the set (list) prove to be too little, then the available memory space can be increased in a straightforward manner.

Thus, in an embodiment, when it is determined that the set (list) does not contain enough memory space (for storing data for a graphics output (frame)), additional memory space is added to the set (list) (in an embodiment by adding one or more additional memory space blocks to the end of the list).

A memory space block added to the set can be any suitable and desired memory space block (in the memory) which is not already included in the set.

In one embodiment, as will be discussed further below, a memory space block is newly set aside (by the host processor) for use by the graphics processing pipeline, and then added to the set (list).

In an embodiment, the graphics processing system operates to "recycle" memory space blocks that have previously been used, e.g. to store data for another (e.g. previous) graphics output (and to add a "recycled" memory space block to the set of blocks of memory space from which memory space is allocated).

Thus, the method in an embodiment comprises, when it is determined (by the memory space allocation circuit) that the set (list) does not contain enough memory space for storing data, adding one or more memory space blocks to the set (list) that were previously used for storing data for another graphics output (e.g. frame or tile).

Thus, in an embodiment, the (another (e.g. next)) memory space block in the set (list) from which memory space is (attempted to be) allocated from is a ("recycled") memory space block that was previously used for storing data for another graphics output.

Correspondingly, blocks of memory space in which the vertex shaded data is stored are in an embodiment "recycled" for use for storing data, e.g. for a later graphics output.

In an embodiment, the graphics processing system operates to "recycle" a memory space block in this manner (only) once it has been determined that the data that it stores is no longer required by the graphics processing pipeline (to, e.g., generate a graphics output (e.g. frame)).

Thus, in an embodiment, the method comprises determining whether data stored in a block of memory space is no longer required by the graphics processing pipeline; and adding the block of memory space to the set of blocks of memory space from which memory space is allocated (only) after it has been determined that the data stored in the block of memory space is no longer required by the graphics processing pipeline.

It can be determined whether the data that a memory space block is storing is no longer required by the graphics processing pipeline in any suitable and desired manner. As discussed above, the data that a memory space block is storing is in an embodiment stored for use by a fragment shading stage (circuit) of the graphics processing pipeline.

Thus, in an embodiment, the graphics processing pipeline (processor) further comprises a fragment shading stage (circuit) that is operable to process vertex shaded attribute data generated by the vertex shading stage (circuit) that is stored in blocks of memory space; and determining whether data stored in a block of memory space is no longer required by the graphics processing pipeline comprises: determining whether the fragment shading stage (circuit) has processed (all of the) (vertex shaded attribute) data stored in the block of memory space; and determining that the data stored in the block of memory space is no longer required by the graphics processing pipeline when it is determined that the fragment shading stage (circuit) has processed (all of) the (vertex shaded attribute) data stored in the block of memory space.

It is believed that the idea of "recycling" memory space blocks when the data they store has been processed by a later processing stage (circuit) of a graphics processing pipeline in this manner is novel and inventive in its own right.

Thus, a third embodiment of the technology described herein comprises a method of operating a graphics processor that executes a graphics processing pipeline comprising a first processing stage that is operable to perform a graphics processing operation to generate output data, and a second processing stage that is operable to process output data generated by the first processing stage, the method comprising:

the first processing stage performing the graphics processing operation to generate first output data;

storing the first output data in a block of memory space;

the second processing stage processing the first output data stored in the block of memory space; and after the first output data stored in the block of memory space has been processed by the second processing stage:

adding the block of memory space to a set of blocks of memory space;

the method further comprising:

the first processing stage performing the graphics processing operation to generate second output data;

allocating memory space for storing the second output data from the block of memory space added to the set of blocks of memory space; and storing the second output data in the allocated memory space.

A fourth embodiment of the technology described herein comprises a graphics processing system comprising:

a graphics processor configured to execute a graphics processing pipeline comprising a first processing stage that is operable to perform a graphics processing operation to generate output data and a second processing stage that is operable to process output data generated by the first processing stage; and a memory storing circuit configured to store output data generated by the first processing stage in a block of memory space;

wherein the graphics processing system is configured to, after the second processing stage has processed first output data generated by the first processing stage that is stored in a block of memory space, add the block of memory space to a set of blocks of memory space; and the memory storing circuit is configured to allocate memory space for storing second output data generated by the first processing stage from the block of memory space added to the set of blocks of memory space, and to store the second output data in the allocated memory space.

As will be appreciated by those skilled in the art, these embodiments of the technology described herein can and in an embodiment do include one or more, and in an embodiment all, of the optional features of the technology described herein described herein, as appropriate. Thus, for example, the first (earlier) processing stage (circuit) is in an embodiment a vertex shading stage (circuit), and the second (later)

processing stage (circuit) is in an embodiment a fragment shading stage (circuit), e.g. as discussed above.

Similarly, the set of memory space blocks is in an embodiment represented by a (linked) list, and the block of memory space is in an embodiment added to the end of the (linked) list.

In these embodiments, once the data that a memory space block is storing has been processed by a later (e.g. fragment) processing stage (circuit) (of the graphics processing pipeline), then that data no longer needs to be stored for use by the graphics processing pipeline, and so the memory space block is "recycled" so that it can store data generated by an earlier (e.g. vertex) processing stage (again) for use by the later (e.g. fragment) processing stage.

By "recycling" memory space blocks, rather than, e.g., setting aside new memory space blocks, the processing requirements for setting aside new memory space blocks can be reduced or avoided.

This "recycling" of memory space blocks can be achieved in any suitable and desired manner. In an embodiment, the graphics processing system operates to keep track of those memory space blocks (in the memory) which are storing data that is still required by the graphics processing pipeline (that is yet to be processed by the later (e.g. fragment) processing stage (circuit)), as well as those memory space blocks (in the memory) which are storing data that is no longer required by the graphics processing pipeline (that has been processed by the later (e.g. fragment) processing stage).

In an embodiment one or more further sets of blocks of memory space are provided (maintained) (in addition to the ("current") set of blocks of memory space from which memory space is allocated) for this purpose, with memory space blocks being moved between the different sets of memory space blocks so as to "re-circulate" memory space blocks for re-use, e.g., over multiple graphics outputs (e.g. frames).

The further one or more sets of memory space blocks can be arranged as desired, but in an embodiment include a set of "exhausted" memory space blocks (i.e. blocks that contain data that is still needed), and a set of "available" memory space blocks (i.e. blocks that do not contain data that is still needed, e.g. blocks that are empty or that contain data that is no longer needed).

Memory space blocks are in an embodiment added to the set of exhausted memory space blocks (moved thereto from the ("current") set of memory space blocks from which memory space is allocated) once those memory space blocks have been filled with data (i.e. exhausted), e.g. and in an embodiment, when it is determined that a (current) memory space block does not have sufficient memory space available to store data, e.g. as discussed above.

Then, when the data that a memory space block is storing is no longer required by the graphics processing pipeline (e.g. when it has been processed), the memory space block is in an embodiment moved from the set of exhausted memory space blocks to the set of available memory space blocks, to signify that the memory space block is available for re-use. The memory space block can then be, and in an embodiment is, moved from the set of available memory space blocks to the ("current") set of memory space blocks from which memory space is allocated to be re-used, e.g. and in an embodiment, when it is determined that the ("current") set of memory space blocks from which memory space is allocated does not contain enough memory space, as discussed above.

Thus, in an embodiment, the method comprises: filling a (the) block of memory space with data, and when the block of memory space has been filled with data: adding the block of memory space to a set of exhausted blocks of memory space; and once the data in the block of memory space has been processed (e.g. by the later, e.g. fragment shading, processing stage): moving the block of memory space from the set of exhausted blocks of memory space to a set of available blocks of memory space. The method in an embodiment comprises then adding the block of memory space to the set of ("current") memory space blocks from which memory space is allocated by moving the block of memory space from the set of available blocks of memory space to the set of memory space blocks from which memory space is allocated, in an embodiment when it is determined that the set of memory space blocks from which memory space is allocated does not contain enough memory space.

In an embodiment, a set of exhausted memory space blocks is provided (and used) for each graphics output (e.g. frame or tile) that is generated by the graphics processing pipeline. Then, when it is determined that a (current) block of memory space does not have sufficient memory space available to store (vertex shaded attribute) data for a graphics output (frame), the (current) block of memory space is in an embodiment added (and in an embodiment moved from the set of memory space blocks from which memory space is allocated) to the set of exhausted memory space blocks for that graphics output (frame).

A set of exhausted memory space blocks for a graphics output (frame) may be completed when the earlier (e.g. vertex) processing stage has completed its processing for that graphics output (frame). Then, when the data stored in the set of exhausted memory space blocks for the graphics output (frame) has been processed by the later (e.g. fragment) processing stage, each memory space block in the set of exhausted memory space blocks for the graphics output (frame) may be moved to the set of available blocks of memory space.

A (each) set of memory space blocks can be provided (and maintained) as desired. In an embodiment, a (and in an embodiment each) set is provided such that the members of the set can be treated together as a single entity, e.g. as discussed above. Thus, in an embodiment, a (and in an embodiment each) set is represented as a, in an embodiment linked, list, e.g. and in an embodiment, as discussed above.

Thus, in an embodiment, one or more, and in an embodiment each, of the ("current") set of blocks of memory space from which memory space is allocated, the set of exhausted blocks of memory space, and the set of available blocks of memory space are represented by a respective, in an embodiment linked, list.

In an embodiment, information indicating the first and/or last memory space block in a (each) (linked) list is maintained (and stored). This information can take any suitable form, but is in an embodiment in the form of (a descriptor comprising) a pointer for pointing to the first memory space block and a pointer for pointing to the last memory space block.

Memory space blocks can be added to a set (list), or moved from one set (list) to another set (list), in any suitable and desired manner.

In linked list embodiments, adding or moving a memory space block from a linked list to another linked list is in an embodiment performed by updating sequence indicating links (e.g. pointers) appropriately.

Thus, for example, moving or adding one or more memory space blocks to the end of a linked list in an embodiment comprises updating the sequence indicating link (e.g. pointer) for the memory space block that was previously at the end of the linked list to indicate that the (first) newly added memory space block is now the next memory space block in the linked list (and the sequence indicating link (e.g. pointer) for the (last) newly added memory space block is in an embodiment updated (to be a "null" pointer) to indicate that it is now the last memory space block in the linked list).

Memory space blocks can be added (or moved) to the start or end of a (linked) list, as suitable and desired.

For example, as discussed above, in the case of a new memory space block being added to the "current" (linked) list representing the set of memory space blocks from which memory space is allocated (from the available list representing the set of available memory space blocks), the new memory space block should be, and in an embodiment is, added to end of the "current" (linked) list. The (current) memory space block indicating information should accordingly be, and in an embodiment is, updated appropriately, i.e. to indicate that the (first) newly added memory space block is now the current memory space block from which the memory space allocation circuit should (attempt to) allocate memory space.

In the case of a newly exhausted memory space block being moved from the "current" (linked) list representing the set of memory space blocks from which memory space is allocated to an (the) exhausted (linked) list representing a set of exhausted memory space blocks, the newly exhausted memory space block is in an embodiment added to the beginning of the (linked) list of exhausted memory space blocks. In this regard, as will be discussed further below, the Applicants have recognised that by adding a newly exhausted memory space block to the beginning of a linked list of exhausted memory space blocks, the number of required link (e.g. pointer) updates can be reduced, as compared to adding a newly exhausted memory space block to the end of the linked list of exhausted memory space blocks.

A (each) set ((linked) list) can be initialised by and/or maintained by any suitable component of the graphics processing system, such as a hardware element of, or software (e.g. driver or firmware) running on, the host processor or the graphics processor.

For example, the graphics processing system may comprise a (fixed function) hardware circuit configured to initialise and/or maintain one or more sets (lists) of memory space blocks. Additionally or alternatively, the graphics processing system (e.g. the graphics processor) may comprise a micro controller unit (MCU), and firmware running on the MCU may be configured to maintain one or more sets (lists) of memory space blocks.

In an embodiment, a (each) set of memory space blocks ((linked) list) is initialised by software running on the host processor, such as a driver (before processing (rendering) begins). For example, the software running on the host processor may initialise a set (list) of exhausted memory space blocks and a set (list) of available memory space blocks as empty ("null") sets (lists). The ("current") set (list) of memory space blocks from which memory space is allocated may be initialised by the software running on the host processor with an initial number of memory space blocks, e.g. as discussed above.

In an embodiment, a (each) set (list) is then maintained by a different component of the graphics processing system during processing (rendering). For example, in an embodiment, the ("current") set (list) of memory space blocks from which memory space is allocated and/or the set (list) of exhausted memory space blocks are maintained (during processing) by a (the) (fixed function) hardware circuit of the graphics processing system. The set (list) of available memory space blocks, however, is in an embodiment maintained by firmware running on the (micro controller unit (MCU) of the) graphics processor. Maintaining the set (list) of available memory space blocks by firmware can allow greater flexibility in handling "out-of-memory" situations, e.g. as compared to fixed function circuitry.

Thus, in an embodiment, when the memory space allocation circuit (of the graphics processor) determines that the ("current") set (list) of memory space blocks from which memory space is allocated does not contain enough memory space, this "out-of-memory" situation is in an embodiment "escalated" from the memory space allocation circuit (of the graphics processor) to (the) firmware for the graphics processor.

This "escalation" from the memory space allocation circuit to the firmware for the graphics processor can be achieved in any suitable and desired manner. In an embodiment, in response to an out-of-memory situation (when the memory space allocation circuit determines that the ("current") set (list) of memory space blocks from which memory space is allocated does not contain enough memory space), the memory space allocation circuit sends an out-of-memory signal to the firmware for the graphics processor, and waits for a response from the firmware for the graphics processor. The firmware for the graphics processor, in response to an out-of-memory signal from the memory space allocation circuit, in an embodiment attempts to provide one or more memory space blocks (from the set (list) of available memory space blocks) to the memory space allocation circuit to be added to the set (list) of memory space blocks from which memory space is allocated.

The Applicants have recognised, however, that it may be the case that there are no memory space blocks available (in the set (list) of available memory space blocks), e.g. because the data stored in all of the memory space blocks is still required by the graphics processing pipeline.

Thus, in an embodiment, (when it is determined (by the memory space allocation circuit) that the set (list) of memory space blocks from which memory space is allocated does not contain enough memory space) it is determined whether any memory space blocks are available to be added to the set (list) of memory space blocks from which memory space is allocated, in an embodiment by (the firmware for the graphics processor) determining whether the set (list) of available memory space blocks includes any memory space blocks (or is empty).

When it is determined (by the firmware for the graphics processor) that one or more memory space blocks are available (in the set (list) of available memory space blocks), then one or more of those memory space blocks are in an embodiment added to the ("current") set (list) of memory space blocks from which memory space is allocated.

When it is determined (by the firmware for the graphics processor) that no memory space blocks are available (when it is determined that the set (list) of available memory space blocks is empty), then the graphics processing system can respond in any suitable manner.

In an embodiment, when the firmware for the graphics processor determines that there are no available memory space blocks (in the set (list) of available memory space blocks), this "out-of-memory" situation is in an embodiment "escalated" from the firmware for the graphics processor to the (driver running on the) host processor.

This "escalation" from the firmware for the graphics processor to the (driver running on the) host processor can be achieved in any suitable and desired manner. In an embodiment, the firmware for the graphics processor sends an "out-of-memory" signal to the (driver running on the) host processor, and waits for a response from the (driver running on the) host processor.

The (driver running on the) host processor, in response to an "out-of-memory" signal from the firmware for the graphics processor, in an embodiment determines a suitable response. For example, the (driver running on the) host processor could determine that the system is "out-of-memory" and that therefore processing should be terminated. However, in an embodiment, the (driver running on the) host processor preferentially attempts to provide the firmware with an additional memory space block (or blocks), rather than terminating processing.

Such an additional memory space block could be newly set aside in memory. However, in an embodiment, the ((driver running on the) host processor of the) graphics processing system preferentially attempts to suspend processing until a previously used memory space block (or blocks) becomes available for "recycling", rather than setting aside a new memory space block. This can facilitate a more efficient use of memory space.

Thus, in an embodiment, the ((driver running on the) host processor of the) graphics processing system (in response to an "out-of-memory" signal) determines whether it is possible to suspend processing and wait for a memory space block (or blocks) to become available for "recycling".

This can be achieved as desired. In an embodiment, it is determined (by the (driver running on the) host processor) whether the later, e.g. fragment shading, stage (circuit) is (currently) processing data that is stored in a block (or blocks) of memory space (which processing will soon be completed).

If it is determined (by the (driver running on the) host processor) that the later, e.g. fragment shading, stage (circuit) is (currently) processing data that is stored in a block of memory space (which processing will soon be completed), then it is in an embodiment determined that processing can be suspended, and memory allocation is in an embodiment paused until the later, e.g. fragment shading, stage has processed the data stored in the block of memory space. Then, once the block has been processed, the data it stores will no longer be needed by the graphics processing pipeline, and so the block can then be, and in an embodiment is, provided for recycling (by adding it to the set (list) of available blocks, and then moving it therefrom to the set (list) of memory space blocks from which memory space is allocated).

If it is determined that processing cannot be suspended, then the ((driver running on the) host processor of the) graphics processing system in an embodiment determines whether it is possible to set aside one or more new memory space blocks (in the memory) for use by the graphics processing pipeline.

This can be achieved as desired. In an embodiment, it is determined that it is possible to set aside one or more new memory space blocks when the total amount of memory space in memory space blocks that have already been set aside is less than a (predetermined) memory space limit.

Thus, in an embodiment, the total amount of memory space in memory space blocks that have been set aside for use by the graphics processing pipeline is determined (by the (driver running on the) host processor), and compared to a (predetermined) memory space limit. Where each memory space block comprises the same amount of memory space, then this in an embodiment involves counting the total number of (already) set aside memory space blocks, and comparing the total number of (already) set aside memory space blocks to a (predetermined) maximum number of memory space blocks. The comparison is then in an embodiment used (by the (driver running on the) host processor) to determine whether or not the memory space limit has been reached.

One or more new memory space blocks are then in an embodiment set aside (only) when it is determined that the memory space limit has not (yet) been reached. The one or more newly set aside memory space blocks are then in an embodiment added to the set (list) of available memory space blocks. Thus, the set (list) of available memory space blocks can include newly set aside memory space blocks, as well as "recycled" memory space blocks, as discussed above.

If the memory space limit has been reached, the ((driver running on the) host processor of the) graphics processing system may then (and in an embodiment does) operate to terminate processing, e.g. for the current graphics output (e.g. frame) being generated. The graphics processing system may then continue with processing the next current graphics output (e.g. frame), if desired.

Once it has determined how to respond, the (driver running on the) host processor can indicate to the firmware for the graphics processor how to proceed in any suitable manner. In an embodiment, the (driver running on the) host processor responds to the firmware for the graphics processor with one or more newly set aside memory space blocks (from which memory allocation can continue), with a "null" memory space block to indicate that processing (memory allocation) should be suspended, or with a termination signal to indicate that processing should be terminated.

As well as increasing the overall amount of memory space available to the graphics processing pipeline by setting aside new memory space blocks, it is also contemplated that the ((driver running on the) host processor of the) graphics processing system could operate to reduce the overall amount of memory space available by withdrawing memory space blocks from use. This will then allow the overall memory usage to more closely track the actual memory space requirements of the graphics processing pipeline.

This can be achieved in any suitable and desired manner. For example, in an embodiment, the total amount of memory space in memory space blocks that have been set aside for use by the graphics processing pipeline is determined (in an embodiment by the (driver running on the) host processor), and compared to an actual amount of memory space used. The actual amount of memory space used could, for example, represent an average amount of memory space used during the generation of a certain number of previous graphics outputs, e.g. frames. The comparison is then in an embodiment used (by the (driver running on the) host processor) to determine whether more memory space than is actually required has been set aside. One or more memory space blocks (that are storing data that is no longer required by the graphics processing pipeline) are then in an embodiment withdrawn from use (only) when it is determined that more memory space than is required has been set aside.

The above described memory space allocation process could be used to allocate memory space to store all of the vertex shaded attribute data that the vertex shading stage (circuit) generates when processing a (any given) set of vertices. However, in an embodiment, vertex data memory allocation is performed "conditionally" and "on demand", e.g. and in an embodiment, as described in US 2019/0012829.

Thus, in an embodiment, memory space for storing vertex data for a vertex or group of vertices is allocated (and the vertex data is stored in the allocated memory space) (only) after a testing operation has determined that the memory space should be allocated for the vertex or group of vertices (and memory space is not allocated (and the vertex data is not stored) when the testing operation does not determine that memory space should be allocated (when the testing operation determines that memory space should not be allocated)).

Thus, in an embodiment, allocating memory space for storing the vertex shaded attribute data from one of the blocks of memory space in the set of blocks of memory space comprises: determining whether memory space should be allocated for the one or more vertices; and when it is determined that memory space should be allocated for the one or more vertices, allocating memory space for storing the vertex shaded attribute data (and when it is determined that memory space should not be allocated for the one or more vertices, not allocating memory space for storing the vertex shaded attribute data).

As discussed in US 2019/0012829, the Applicants have recognised in this regard that in many cases not all of the vertices defined for an, e.g. draw call, will in fact be used to generate the desired graphics output, e.g. frame for display (e.g., when one or more vertices lie outside of the view frustum or when one or more vertices belong (solely) to back-facing primitives), and so memory space allocation for vertex shaded attribute data of such "unused" vertices is unnecessary and desirable to be avoided.

The determination of whether memory space should be allocated for a vertex (or group of vertices) can be performed in any desired and suitable manner, and is in an embodiment performed substantially as described in US 2019/0012829.

Thus, in an embodiment, the graphics processing pipeline is a tile based graphics processing pipeline, and the tiler (the tiling stage (circuit)) of the graphics processing pipeline (i.e. the stage of the graphics processing pipeline that sorts the primitives into respective regions of the graphics output and prepares appropriate lists of primitives for processing for each such region of the graphics output (e.g. frame)) performs the determination of whether memory space should be allocated for the vertices by determining whether vertices belong to (are to be used for) primitives that could be visible in the output of the graphics processing operation.

As discussed in US 2019/0012829, the tiling process will normally test whether primitives are (at least partially) within the view frustum and are therefore required for generating the output of the graphics processing operation. The tiler will also typically include a backward facing culling test. Thus, it is particularly advantageous for the tiler to perform the determination, as the tiler already operates to perform "visibility" tests (such as view frustum and/or back facing tests and so on) on primitives of the scene to be displayed.

Thus, in an embodiment, the determining of whether a vertex should be allocated memory space comprises determining whether the vertex belongs to (is to be used for) a primitive that has been included in a primitive list for the graphics processing operation being performed.

In an embodiment, the determination of whether or not memory space should be allocated for storing vertex shaded attribute data for a vertex or group of vertices further comprises, in addition to the, e.g. "visibility" test discussed above, also determining whether memory space has already been allocated for vertex shaded attributes data for a vertex, e.g. and in an embodiment, as discussed in US 2019/0012829.

The vertex shading stage (circuit) of the graphics processing pipeline (processor) performs a vertex shading operation on one or more vertices to generate output vertex (shaded attribute) data.

The one or more vertices that are processed by the vertex shading stage (circuit) can be any desired and suitable set of vertices to be processed by the graphics processing pipeline. The one or more vertices may be, e.g. and in an embodiment, vertices defined for the same graphics output (render target) (e.g. frame), and in an embodiment for the same draw call.

The vertex shading operation could perform vertex shading for all of the vertex attributes of the vertices, or could perform vertex shading for at least one but not all of the vertex attributes of the vertices (i.e. for some but not all of a plurality of vertex attributes of the one or more vertices).

The at least one vertex attribute that is processed in the vertex shading operation can be any one or more desired and suitable vertex attribute(s). There may be only one attribute that is processed, or there may be plural attributes that are processed.

For example, and in an embodiment, the vertex attribute(s) that are processed in the vertex shading operation comprise one or more position attributes of the vertices. Usually there will only be a single position attribute, consisting of (X, Y, Z, W) components. In this case, the vertex attributes that are processed in the vertex shading operation will comprise (at least) that single position attribute. However, there may also be other position attributes, such as a point size or a line width (e.g. when rendering points and lines).

In an embodiment all the position attributes are vertex shaded in the vertex shading operation, but less than all, such as only one of the position attributes could be processed, if desired. In one embodiment, only position attributes are processed in the vertex shading operation (and thus in an embodiment no varyings are processed in the vertex shading operation), but in another embodiment one or more (or all) other (non-position) attributes are processed as well as one or more (or all) position attributes.

In embodiments of the technology described herein, the vertex shading operation comprises performing vertex shading computations on (at least) the position attributes (position data) of the vertices being processed. Thus, the vertex shading operation in an embodiment transforms at least, and in an embodiment only, the position attributes of the vertices being processed.

The vertex shaded attribute data that is generated by the vertex shading operation can comprise any desired and suitable such data, and will, e.g., depend upon the vertex attributes that the vertex shading operation processes. As discussed above, the vertex shaded data generated by the vertex shading operation in an embodiment comprises (at least) vertex shaded position data (e.g. the transformed geometry) for the vertices. The vertex shaded data may also comprise vertex shaded data for one or more of the non-position vertex attributes.

Once a set ((linked) list) of memory space blocks has been provided, and vertex shaded attribute data to be stored in the set of memory space blocks has generated by the vertex shading stage (circuit), memory space in a memory space block in the set of memory space blocks can then be allocated for storing the vertex shaded attribute data, in the manner described above.

Once memory space has been allocated from a memory space block for storing (e.g. vertex shaded attribute) data, then the data should be, and is in an embodiment, stored in the memory space allocated for the data in question.

Any suitable and desired data can be stored in the allocated memory space.

In an embodiment, at least some, and in an embodiment all, of the vertex shaded attribute data generated by the vertex shading operation is stored in the memory space allocated to the vertex. Thus, vertex shaded attribute data is in an embodiment stored for one or more, and in an embodiment for each, of the attributes for the vertex that are vertex shaded.

For example, in an embodiment, vertex shaded position attribute or attributes for the vertex are stored in the memory space allocated to the vertex. Additionally or alternatively, data for one or more other non-position attributes (varyings) for the vertex are in an embodiment stored in the allocated memory space.

In embodiments where the vertex shading operation is operable to vertex shade only some but not all of the attributes for the vertices (e.g., and in an embodiment, to only vertex shade the position attribute(s) for the vertices), then in an embodiment, the vertex shading of any further attributes, such as varyings, is performed in response to, and conditionally dependent on, the result of the testing stage (circuit), e.g. and in an embodiment as described in US 2019/0012829.

This then means that further vertex shading operations e.g., and in an embodiment, for vertex attributes that are not required by the testing stage (circuit), should be and are in an embodiment (only) performed for those vertices that "pass" the testing stage (e.g., and in an embodiment, that are determined by the testing stage as (potentially) contributing to the render output being generated).

Once the (complete) vertex shaded attribute data for the vertices that are to be processed has been generated and stored in the allocated memory space, then the (complete) vertex shaded attribute data for the vertices (i.e. the vertex shaded data from the vertex shading operation), together with, e.g., the primitive lists generated by the tiler, can be, and in an embodiment is, used by the remaining stages of the graphics processing pipeline (e.g. the fragment shading stage) to generate the desired graphics output (render target) of the graphics processing pipeline, e.g. frame, e.g. as described above. This processing will, inter alia, read the relevant vertex shaded vertex data from the allocated memory space (memory addresses) where it has been stored, e.g. and in an embodiment from a set (list) of exhausted blocks of memory space.

Thus, in an embodiment, one or more memory space blocks in a set (list) of exhausted memory space blocks are provided for processing to the later, e.g. fragment shading, processing stage (circuit) of the graphics processing pipeline.

The final output (e.g. frame) of the graphics processing operation can then, e.g., be written, e.g. to a frame buffer, in main memory, from where it can then, e.g., be provided to a display for display, or otherwise processed.

The process of the technology described herein can then be performed for a next graphics output (e.g. frame) in a sequence of graphics outputs (e.g. frames) being generated, and so on. This may involve the set (list) of memory space blocks being used for storing data for the next graphics output(s) (e.g. frame(s)), or a new set (list) of memory space blocks being provided for the (each) next output (e.g. frame) generated.

The technology described herein can be used for all forms of output that a data processor (and processing pipeline) may be used to generate. For example, in the case of graphics processing, the graphics processing pipeline may generate frames for display, render-to-texture outputs, etc. The output data values from the processing are in an embodiment exported to external, e.g. main, memory, for storage and use, such as to a frame buffer for a display.

The technology described herein is applicable to any suitable form or configuration of graphics processor and graphics processing system. It is particularly applicable to tile-based graphics processors and graphics processing systems. Thus in an embodiment, the graphics processor is a tile-based graphics processor (and pipeline).

In an embodiment, the various functions of the technology described herein are carried out on a single graphics processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

FIG. 1 shows a graphics processing system 100 in accordance with an embodiment of the technology described herein. An application, such as a game, executing on a host processor (CPU) 1 will require graphics processing operations to be performed by an associated graphics processing unit (GPU) (graphics processor) 2. To do this, the application will generate API (Application Programming Interface) calls that are interpreted by a driver for the graphics processor 2 that is running on the host processor (CPU) 1 to generate appropriate commands to the graphics processor 2 to generate graphics output required by the application. To facilitate this, a set of "commands" will be provided to the graphics processor 2 in response to commands from the application running on the host system (CPU) 1 for graphics output (e.g. to generate a frame to be displayed).

As shown in FIG. 1, the graphics processing system 100 further comprises a display controller 3, and a memory controller 5. As shown in FIG. 1, the various units of the graphics processing system 100 can communicate via an interconnect 4 and have access to off-chip memory 6. In this system, the graphics processing unit (GPU) 2 will render frames (images) to be displayed and store those frames in appropriate frame buffers in the main memory 6, and the display controller 3 will then provide the frames to a display panel 7 for display.

Figure 2:
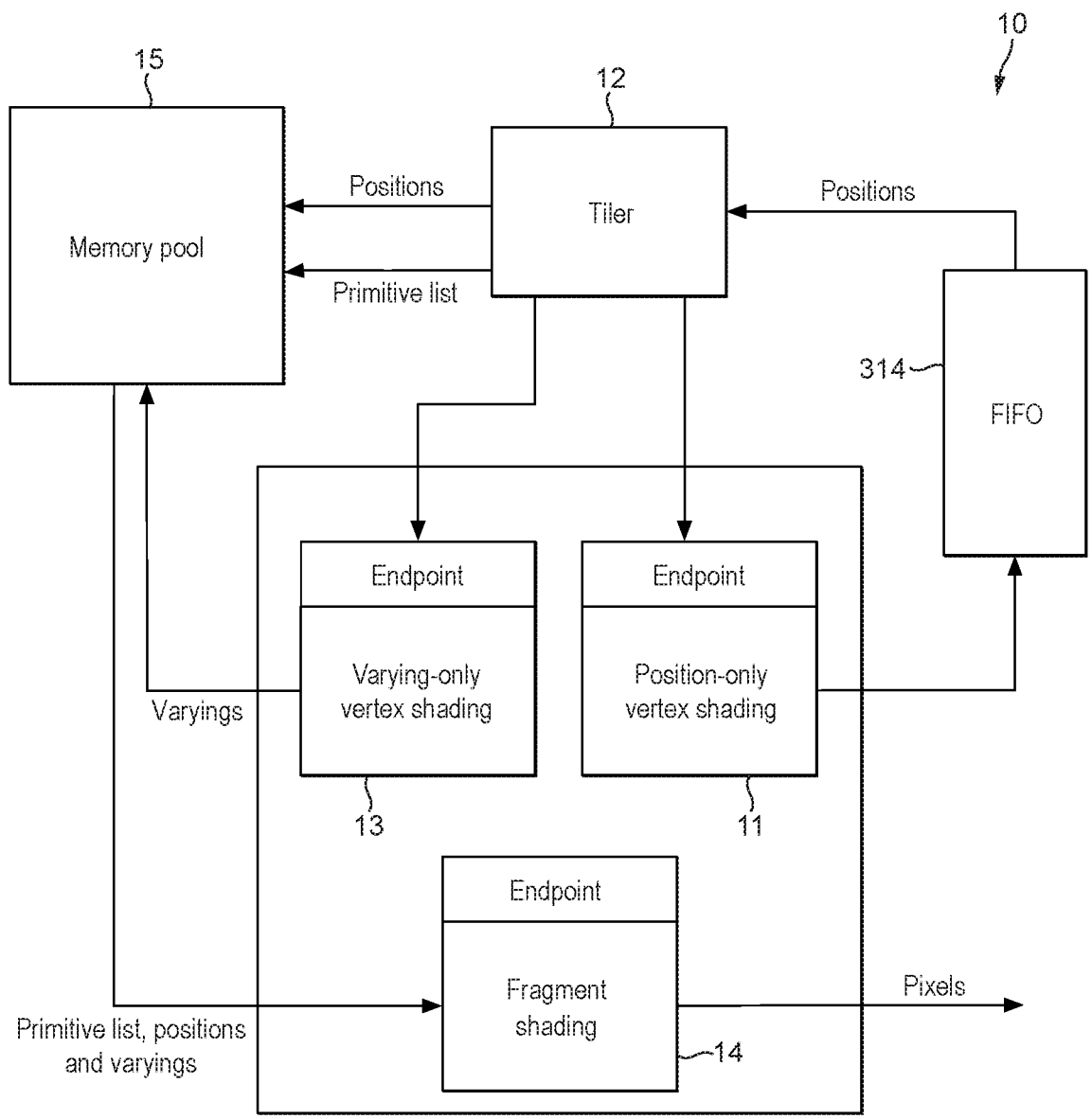
FIG. 2 shows schematically a graphics processing pipeline according to an embodiment of the technology described herein.

FIG. 2 shows a graphics processing pipeline 10 that is executed by the graphics processor 2 in the present embodiment. The graphics processing pipeline 10 shown in FIG. 2 is a tile-based renderer and will thus produce tiles of a render output data array, such as an output frame to be generated. To do this, the graphics processing pipeline 10 generates vertex data and primitive lists in a vertex processing pass, and stores this data in a memory space pool 15 in main memory 6 for use in a subsequent fragment processing pass.

The graphics processing pipeline 10 of FIG. 2 is configured substantially as described in US 2019/0012829. Thus, as shown in FIG. 2, the graphics processing pipeline 10 comprises a position shading stage 11, a tiler 12, a varying-only vertex shading stage 13 and a fragment shading stage 14.

The position shading stage 11 is a vertex shading stage of the graphics processing pipeline 10 that is configured to perform a first vertex shading operation to vertex shade the positional attributes only of the vertices being processed. The tiler 12 triggers this first vertex shading operation conditionally on a per-vertex (or per-group of vertices) basis as part of its operation. Thus, in this embodiment, the position shading operation 11 is implemented in parallel with the tiling operation 12 of the graphics processing pipeline 10.

The position shading stage 11 is operable to receive vertices (that is, the data values associated with the original attributes for the vertices) from the application that requires the graphics processing. The position shading stage 11 will then perform vertex shading computations on the positional attributes of those vertices (e.g. by means of some transformation function) to generate partial vertex shaded data (that is, partially shaded vertices where only the positions have been "shaded" (e.g. transformed)).

The position-shaded data is then fed to the tiler 12 of the graphics processing pipeline 10 via a FIFO 314.

The tiler 12 uses this input, together with a list of the primitives to be processed (which is indicated in terms of the respective indices of the vertices making up each primitive), to identify which primitives should be processed for each tile that the render output (frame) has been divided into, and prepares a respective primitive list (tile list) for each tile (and/or set(s) of plural tiles), indicating the primitives that should be processed for that tile(s). The tiler 12 can sort the primitives into tiles using any desired and suitable technique for that process. (It will be appreciated here that the only vertex shaded data required for the tiler to generate the primitive list(s) is the vertex shaded position data.)

As part of its operation, the tiler 12 will identify primitives that are required to be processed further to generate the render output. This may include, for example, performing view frustum and back-face culling tests on the primitives.

In the present embodiment, the tiler 12 also operates to determine which vertices should be allocated memory space for storing their vertex shaded attributes data in a pool 15 of memory space that has been set aside for storing the vertex shaded attributes data in the memory 6. The tiler 12 does this by assuming that each vertex that is to be included in a primitive list (i.e. each vertex that has been determined to belong to a visible primitive) should be allocated memory space in the memory space pool 15 for the vertex shaded attributes data.

As part of this memory allocation determination, the tiler also determines whether a given vertex has already been allocated memory space in the memory space pool 15 for its vertex shaded attributes or not (and only allocates new memory space in the memory space pool 15 to a vertex if it is determined that memory space has not already been allocated to that vertex).

The memory space allocation operation will be discussed in more detail below.

After it has been determined by the tiler 12 that a vertex (or group of vertices) should be allocated memory space in the memory space pool 15, the graphics processing system is triggered to allocate memory space for the vertex or group of vertices in the memory space pool 15.

In the present embodiment, the tiler 12 also operates to determine which vertices should be subjected to a second vertex shading operation. The tiler 12 does this by again assuming that each vertex that is to be included in a primitive list (i.e. each vertex that has been determined to belong to a visible primitive) should be subjected to a second vertex shading operation.

After it has been determined by the tiler 12 that a vertex (or group of vertices) should be subjected to a second vertex shading operation, the varying only vertex shading stage 13 is triggered to perform vertex shading computations (a second vertex shading operation) on the remaining varying data (attributes) of the vertex (or group of vertices) in question.

In the present embodiments, the varying shading stage 13 is configured to perform vertex shading computations on a vertex or group of vertices on demand, i.e. as and when it is determined that a vertex (or group of vertices) should be subjected to the second vertex shading operation.

It will be appreciated that any vertices that have been subjected to the second vertex shading operation at the varying-only vertex shading stage 13 will now have a complete set of vertex shaded attributes. This data can then be used, together with the tile primitive lists (generated by the tiler 12), in a subsequent fragment processing pass to generate the desired output of the graphics processing pipeline, such as a frame for display.

Thus, the vertex shaded positions and varyings data (and the primitive lists) are stored in the allocated memory space in the memory space pool 15, and read therefrom by the fragment shader stage 14 of the graphics processing pipeline 10 for subsequent processing.

The fragment shader stage 14 performs appropriate fragment front-end, rendering (fragment shading), and fragment back-end, processing operations.

The front end operations include primitive (triangle) setup and rasterisation of the primitives.

The rasteriser will receive primitives to be rasterised, test those primitives against sampling point positions, and generate graphics fragments to be rendered representing the primitives accordingly. Each fragment generated by the rasteriser may represent (have associated with it) a single sampling point, or plural sampling points, as desired, e.g. a set of four (2×2) sampling points.

The renderer then processes the fragments generated by the rasteriser to generate rendered fragment data (such as red, green and blue (RGB) colour values and an "Alpha" (transparency) value) for (covered) sampling points that the fragments represent. These rendering processes may include, for example, fragment shading, blending, texture-mapping, etc. In the present embodiment, the renderer is, as shown in FIG. 2, in the form of a programmable fragment shader.

The rendered fragment data (sampling position data) is then written to a tile buffer and, subsequently, written out as pixel data to a frame buffer in memory 6, e.g. for display by display 7 (this may include backend fragment operations, such as downsampling, to determine the final pixel colours to be stored in the frame buffer).

It will be appreciated that whilst the first and second vertex shading stages (reference numerals 11 and 13, respectively) are shown as separate stages of the graphics processing pipeline of FIG. 2, in an embodiment the first and second vertex shading operations are performed as respective, different, passes in the same vertex shading execution core.

As discussed above, in the present embodiment, the tiler 12 is operable to, in response to determining that a primitive will be potentially visible in the render output being generated, both allocate memory space for storing vertex shaded attributes data for the vertices of the primitives in the memory space pool 15, and trigger the second, varying only vertex shading for the vertices of the primitive.

Figure 3:
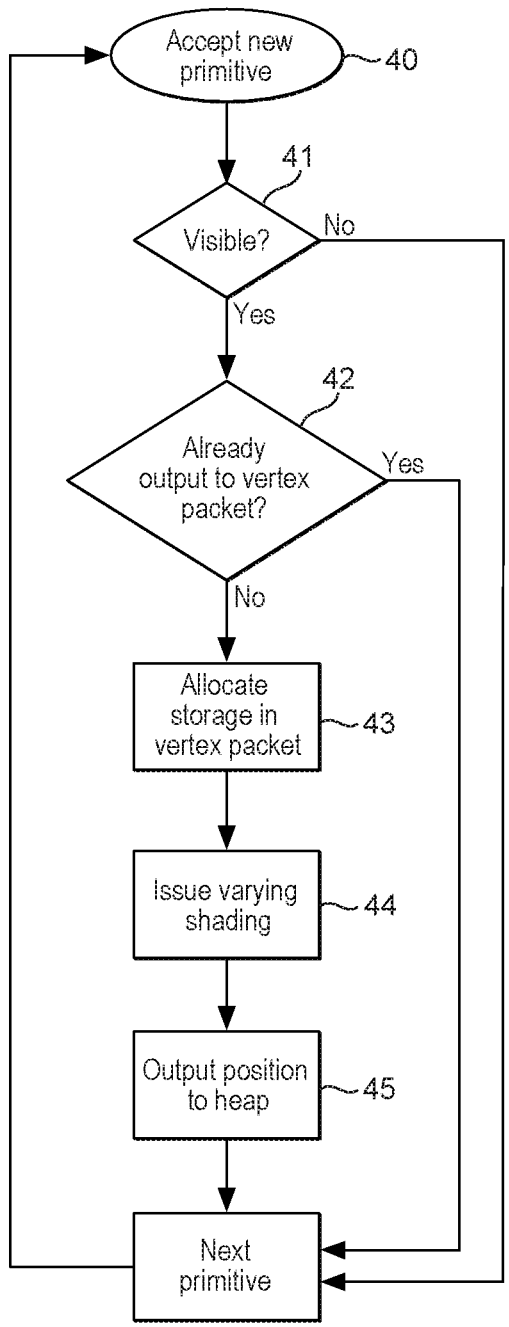
FIG. 3 is a flowchart showing the allocation of memory space to vertices in an embodiment of the technology described herein.

FIG. 3 illustrates this operation of the tiler 12.

In particular, as shown in FIG. 3, the tiler 12 will accept a new primitive (step 40) and determine if that primitive is (potentially) visible (step 41) (in the present case by determining whether the primitive should be placed in a primitive list or not).

If the tiler 12 determines that the primitive is not visible, then, as shown in FIG. 3, the process moves on to the next primitive.

On the other hand, if the tiler 12 determines that the primitive is (potentially) visible at step 41, it then determines for each vertex of the primitive, whether the vertex has already been allocated memory space in the memory space pool 15 (step 42). If the tiler 12 determines that all the vertices of the primitive have already been allocated memory space, then the process proceeds to the next primitive.

On the other hand, for any vertices of the primitive for which memory space has not already been allocated in the memory space pool 15, memory space is then allocated in the memory space pool 15 for that vertex or vertices (step 43). This process will be described in more detail below.

Correspondingly, the tiler 12 requests the varying shading for that vertex or vertices (step 44).

As shown in FIG. 3, the tiler 12 also outputs the vertex shaded position data for the vertex or vertices to the allocated memory space in the memory space pool 15 (step 45).

The process then proceeds to the next primitive for the render output being generated, and so on.

Figure 4:
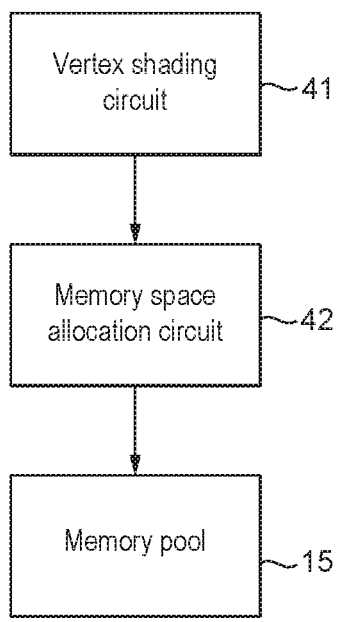
FIG. 4 shows the allocation of memory space according to an embodiment of the technology described herein.

FIG. 4 illustrates memory space allocation, according to an embodiment of the technology described herein. As shown in FIG. 4, a memory pool 15 in the memory 6 is provided (by the host processor 1) for use by the graphics processing pipeline 10 being executed by the graphics processor 2. When the vertex shading stage 41 of the graphics processing pipeline 10 generates vertex data that is to be stored for use by a subsequent fragment processing stage of the graphics processing pipeline 10, a memory space allocation circuit 42 of the graphics processor 2 allocates memory space from the memory pool 15 and stores the vertex data in the allocated memory space.

The memory pool 15 is formed from set of chunks of memory space (memory space blocks) which, in the present embodiment, are linked together in linked lists. Each memory space chunk (block of memory space) is initially set aside for use by the graphics processing pipeline 10 by the host processor 1, and comprises a set of contiguous memory addresses in memory 6. Each memory space chunk may be relatively small in size, e.g. such that the vertex shaded data for a render output is stored across plural different memory space chunks.

In the present embodiment, the memory space allocation circuit 42 allocates memory space from a memory space chunk in a "current chunk list", which is a linked list of memory space chunks that are used to store vertex data and primitives lists for a render output (e.g. frame) that is currently being generated by the graphics processing pipeline 10. Then, once that memory space chunk becomes filled with data (exhausted), the memory space allocation circuit 42 begins allocating memory space from the next chunk in the current chunk list, and so on.

If all of the memory space chunks in the current chunk list then become filled with data (exhausted), additional memory space chunks may be added to the end of the current chunk list so as to provide additional memory space to store vertex data and primitives lists for the render output (e.g. frame) currently being generated. To facilitate this, a second set of "available" memory space chunks is maintained, which in the present embodiment is also in the form of a linked list.

As will be discussed in more detail below, memory space chunks in this "available chunk list" can be memory space chunks newly set aside in the memory 6 by the host processor 1 for use by the graphics processing pipeline 10. However, memory space chunks in the available chunk list are preferentially "recycled" chunks of memory space that have previously been used, e.g. when generating a previous render output.

To facilitate this "recycling" of memory space chunks, a third set of "exhausted" memory space chunks is also maintained, which in the present embodiment is also in the form of a linked list. Once a memory space chunk in the current chunk list becomes filled with data (exhausted), it is moved from the current chunk list to this "exhausted chunk list". Thus, each chunk in the exhausted chunk list stores data that the graphics processing pipeline 10 needs for fragment processing purposes.

Then, once the data in a memory space chunk been subjected to fragment processing, that chunk is moved from the exhausted chunk list to the available chunk list, so that it is then available for re-use.

The Applicants have recognised that the "recycling" of memory space blocks in this manner can allow a "steady state" linked list allocation to be reached, where chunks are used and then recycled without the need for further host intervention or further memory allocation from the host. Moreover, this can allow the need for memory management unit (MMU) maintenance, such as the need to perform page table updates when more memory is allocated, to be reduced. Accordingly, the technology described herein can reduce memory allocation processing requirements.

Figure 5C:
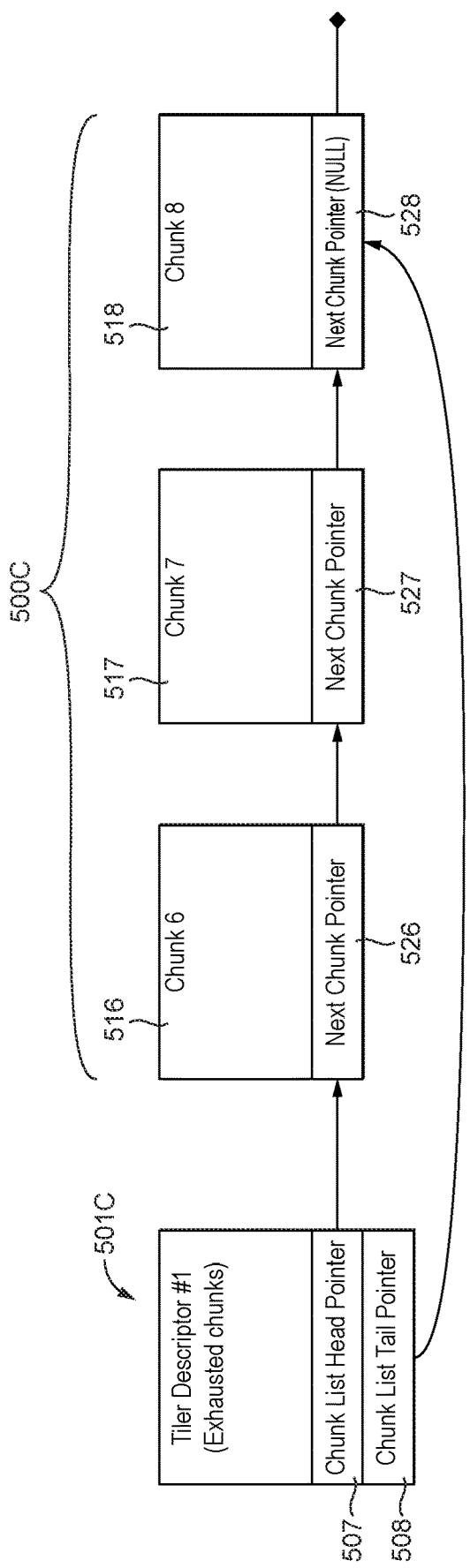

FIGS. 5A-C illustrate examples of the three linked lists of memory space chunks that the memory pool 15 includes, in embodiments of the technology described herein: a "current chunk list" 500A, an "available chunk list" 500B, and an "exhausted chunk list" 500C.

FIG. 5A shows the current chunk list 500A, which comprises memory space chunks that are used to store vertex data and primitives lists for a render output (e.g. frame) that is currently being generated by the graphics processing pipeline 10, according to the present embodiment. As discussed above, the vertex data and primitive lists are generated in a vertex processing pass, and are stored for use in a subsequent fragment processing pass to generate the render output, e.g. frame.

As shown in FIG. 5A, the current chunk list 500A in this example includes three linked memory space chunks: Chunk 0, Chunk 1 and Chunk 2. However, it will be appreciated that any number of linked chunks can be used, and the number of chunks in the list can change with time.

Each memory space chunk in the current chunk list 500A comprises a contiguous set of memory address for storing data, and a pointer pointing to the next memory space chunk in the list, or a null pointer indicating that the respective chunk is the last chunk in the list.

Thus, as shown in FIG. 5A, Chunk 0 comprises a set of contiguous memory addresses 510 and a pointer 520 pointing to Chunk 1. Chunk 1 comprises a set of contiguous memory addresses 511 and a pointer 521 pointing to Chunk 2. Chunk 2 is the last memory chunk in the list and comprises a set of contiguous memory addresses 512 and a null pointer 522 indicating that Chunk 2 is the last chunk in the list.

Although not shown in FIG. 5A, each memory space chunk can also include further header information, such as pointers indicating the top and bottom memory addresses of a memory chunk and/or information indicating the size of a (e.g. the next) memory chunk.

The memory chunks of the current chunk list 500A are used in the order in which they are arranged in the linked list. Thus, in this example, memory space is first allocated by the memory allocator 42 from Chunk 0. Then when Chunk 0 is full, memory allocator 42 allocates memory space from Chunk 1. Then when Chunk 1 is full, memory allocator 42 allocates memory space from Chunk 2.

To facilitate this, as shown in FIG. 5A, a heap descriptor 501A is maintained and stored in association with the current chunk list 500A. The heap descriptor 501A is used by the memory allocator 42 to determine where in memory 6 the allocation of requested memory space should begin from.

In particular, as shown in FIG. 5A, the heap descriptor 501A includes a current chunk pointer 504, which points to the chunk in the current chunk list 500A (the "current" chunk) from which the memory allocator 42 should attempt to allocate memory space. The current chunk pointer 504 initially points to the first chunk in the list, Chunk 0, and is updated to point to the next chunk in the list once the current chunk becomes full with data.

The heap descriptor 501A also includes top and bottom allocation pointers 502, 503. These pointers point to top and bottom memory addresses, respectively, in the current chunk from which memory allocation should begin, as will be described in more detail below.

Once a chunk in the current chunk list 500A becomes full with vertex data and primitive lists, it is added to an exhausted chunk list. Thus, each chunk in an exhausted chunk list stores data that the graphics processing pipeline 10 needs for fragment processing purposes.

FIG. 5C shows an example exhausted chunk list 500C, according to the present embodiment. As shown in FIG. 5C, the exhausted chunk list 500C of the present embodiment includes three linked "exhausted" memory space chunks: Chunk 6, Chunk 7 and Chunk 8. However, it will be appreciated that any number of linked chunks can be present. Moreover, multiple different exhausted chunk lists may be provided, e.g. each one comprising data that the graphics processing pipeline 10 still requires for a different render output. Thus, once a chunk in the current chunk list 500A is filled with data for a particular render output, it can be added to the exhausted chunk list that is being maintained for that render output.

The memory space chunks in the exhausted chunk list 500C have the same form as the memory space chunks in the current chunk list 500A, and so each comprise a contiguous set of memory address for storing data 516-518, and a pointer 526-528.

A tiler descriptor 501C is also maintained and stored in association with the exhausted chunk list 500C. The tiler descriptor 501C comprises a pointer 507 pointing to the first chunk in the exhausted chunk list 500C, and a pointer 508 pointing to the last chunk in the exhausted chunk list 500C.

FIG. 5B shows the available chunk list 500B, which comprises memory space chunks which are available to be added to the end of the current chunk list 500A, when additional memory space is required to store vertex data and primitive lists in the current chunk list 500A.

As will be described in more detail below, the available chunk list 500B can comprise "new" (empty) memory space chunks provided by the host processor 1, as well as "recycled" memory space chunks storing data which is no longer needed by the graphics processing pipeline 10, e.g. because that data has already been used in the fragment processing pass.

As shown in FIG. 5B, in the present embodiment, the available chunk list 500B includes three linked memory space chunks: Chunk 3, Chunk 4 and Chunk 5. However, it will be appreciated that any number of linked chunks can be present. The memory space chunks in the available chunk list 500B have the same form as the memory space chunks in the current chunk list 500A, and so each comprise a contiguous set of memory address for storing data 513-515, and a pointer 523-525.

A heap context descriptor 501B is also maintained and stored in association with the available chunk list 500B. The heap context descriptor 501B comprises a pointer 505 pointing to the first chunk in the available chunk list 500B, and a pointer 506 pointing to the last chunk in the available chunk list 500B.

Figure 6:
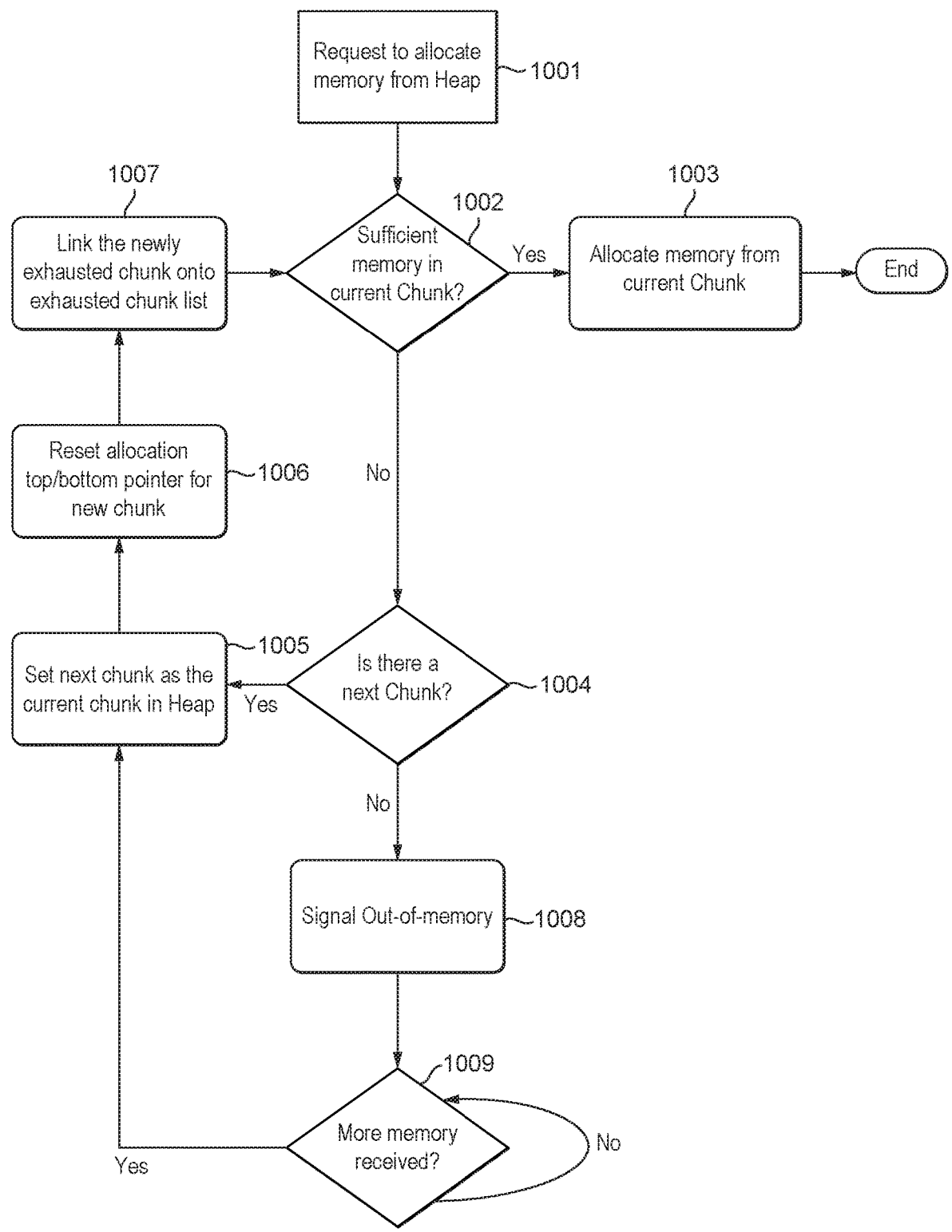
FIGS. 6, 7 and 8 are flowcharts showing a memory allocation process in accordance with an embodiment of the technology described herein.
Figure 7:
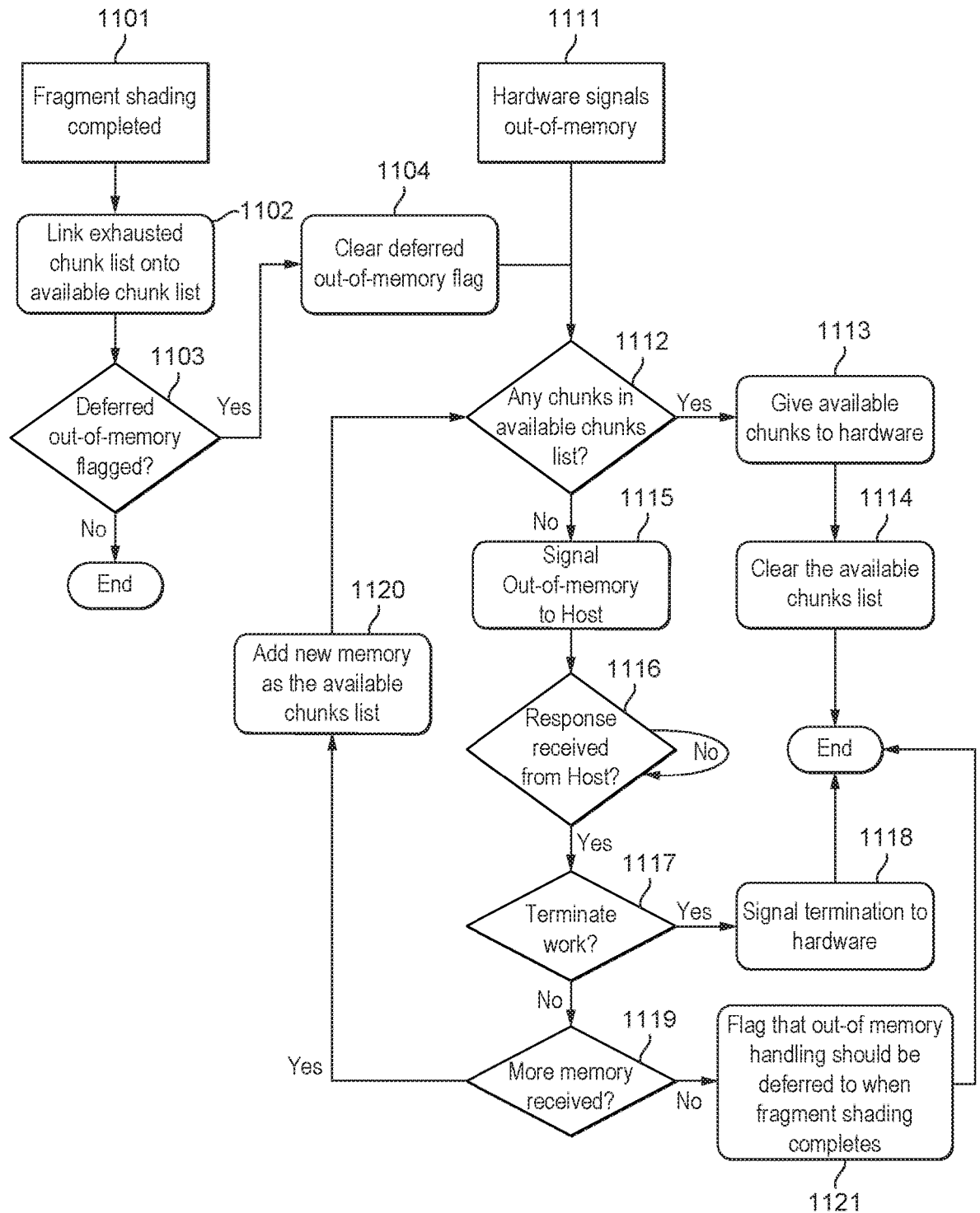
Figure 8:
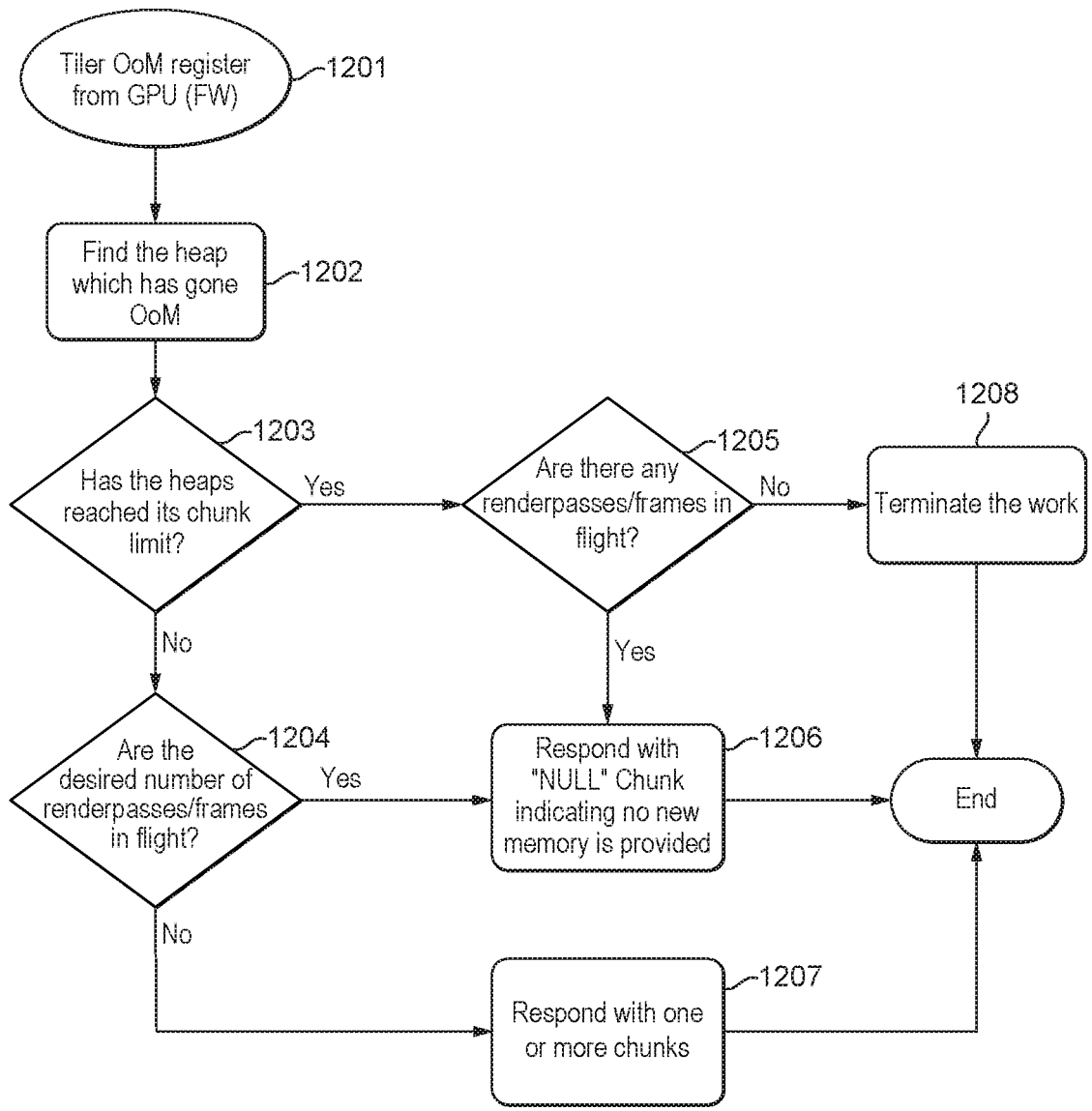

FIGS. 6 to 8 illustrate the memory space allocation process of the present embodiment in more detail. In the present embodiment, the graphics processing pipeline 10 generates a render output (e.g. frame) by performing a vertex processing pass to generate vertex data and primitive lists for the render output, storing the vertex data and primitive lists for the render output in chunks of memory space (memory space blocks) arranged in a linked list, and then reading and processing the stored vertex data and primitive lists in a subsequent fragment processing pass.

FIG. 6 illustrates aspects of the memory allocation process that are performed by the memory space allocation circuit 42 of the graphics processor (GPU) 2, FIG. 7 illustrates aspects of the memory allocation process that are performed by firmware running on the graphics processor (GPU) 2 of the graphics processing system, and FIG. 8 illustrates aspects of the memory allocation process that are performed by the host processor (CPU) 1 of the graphics processing system.

In the process of FIG. 6, the memory allocator 42 initially attempts to allocate memory space to store data generated by the (vertex shading stage 41 of the) graphics processing pipeline 10 from the current chunk (memory space block) in the linked list (heap) (the current chunk list). If, however, the current chunk in the current chunk list does not have sufficient memory space available, then the required memory space is instead allocated from the next chunk (memory space block) in the current chunk list. If, however, there is no next chunk in the current chunk list (i.e. if the current chunk is the last chunk in the linked list for the render output), then the memory allocator 42 generates an out-of-memory signal, and the required memory space is instead allocated from a chunk (memory space block) that is received and added to the end of the current chunk list in response to the out-of-memory signal.

Thus, as shown in FIG. 6, at step 1001, a request to allocate memory space is received by the memory allocator 42 from the graphics processing pipeline 10. At step 1002, the memory allocator 42 determines whether there is sufficient memory space available in the current chunk in the current chunk list to allocate the requested amount of memory space from the current chunk. (This is done by identifying if the top and bottom pointers 502, 503 will overlap, as will be discussed below with reference to FIG. 12C.)

If it is determined that there is sufficient memory space available in the current chunk, then the requested memory space is allocated from the current chunk at step 1003.

Otherwise, if it is determined that there is not sufficient memory space available in the current chunk to carry out the requested memory allocation, then at step 1004 the memory allocator 42 determines if there is a chunk in the current chunk list following the current chunk. If there is a next chunk in the current chunk list, then that next chunk becomes the new current chunk at step 1005 by updating the current chunk pointer 504. The top and bottom allocation pointers 502, 503 are set to the top and bottom memory addresses for the new current chunk at step 1006, and at step 1007, the newly exhausted chunk (the previous current chunk) is added to an exhausted chunk list.

It is then determined whether there is sufficient memory available in the new current chunk at step 1002, and if there is sufficient memory space available, the requested memory space is allocated from the new current chunk at step 1003.

If, however, at step 1004 the memory allocator 42 determines that there is no next chunk in the current chunk list, then an out-of-memory signal is generated by the memory allocator 42 at step 1008 and sent to the firmware for the graphics processor 2 that is executing the graphics processing pipeline 10. The out-of-memory situation is thereby escalated to the firmware. The memory allocator 42 then waits for a new chunk (or chunks) to be received from the firmware at step 1009. While waiting, the memory allocator 42 may respond to any new memory allocation requests with a fault response.

Once a new chunk is received, the newly received chunk is linked into the current chunk list for the render output (at the end of the linked list), and becomes the new current chunk at step 1005. The top and bottom pointers 502, 503 are updated at step 1006, and at step 1007, the newly exhausted chunk (the previous current chunk) is added to the exhausted chunk list.

It is then determined whether there is sufficient memory available in the newly received chunk at step 1002, and if there is sufficient memory space available, the requested memory space is allocated from the newly received current chunk at step 1003.

The process of FIG. 7 is performed by the graphics processor 2 firmware in response to an out-of-memory signal received from the hardware memory allocator 42 (at step 1008 of FIG. 6). In the process of FIG. 7, the firmware attempts to provide the memory allocator 42 with a chunk (or chunks) of memory space that the memory allocator 42 can then continue allocating memory space from. This memory space chunk can be a new (previously unused) chunk of memory space provided by the host processor 1, but is preferentially a recycled chunk of memory space that was previously used, e.g. when generating a previous render output.

To do this, the firmware maintains a linked list of "available" memory space chunks from which the memory allocator can continue allocating memory space, and memory space chunks are added to this available chunk list once the data that they store is no longer required by the graphics processing pipeline 10 for fragment processing purposes.

Thus, as shown in FIG. 7, when the graphics processor 2 completes fragment processing for a render output (e.g. frame) (at step 1101), the graphics processor 2 signals this fact to the firmware. The firmware, in response to that signal, then moves the memory space chunks from the exhausted chunk list for that render output (frame) to the available chunk list (at step 1102).

Then, when at step 1111, an out-of-memory signal is received by the firmware from the memory allocator 42, the firmware, at step 1112, uses the available chunk list to determine if there is an available chunk (or chunks) which can be provided to the memory allocator 42 for use for the current render output. If it is determined that there is an available chunk (or chunks) in the available chunk list, then that chunk (or chunks) is provided to the memory allocator 42 at step 1113, and is removed from the available chunk list at step 1114.

Otherwise, if it is determined at step 1112 that there are no currently available memory space chunks from which the memory allocator 42 can continue allocating memory space (if it is determined that the available chunk list is empty), then the firmware generates an out-of-memory signal at step 1115, and sends the out-of-memory signal to the host processor (CPU) 1 of the graphics processing system. The out-of-memory situation is thereby escalated to the host processor 1. The firmware then waits for a response to the out-of-memory signal from the host processor 1 at step 1116.

As will be discussed further below with reference to FIG. 8, the host processor 1 can respond to an out-of-memory signal from the firmware by setting aside a new memory space chunk (or chunks) in the memory 6, by indicating that processing for the current render output should be terminated, or by indicating that vertex processing should be suspended (paused) until fragment processing has been completed for a previous render output, such that a previously used memory space chunk (or chunks) becomes available for recycling.

Thus, once the firmware receives a response from the host processor 1, the firmware determines at step 1117 whether the response indicates that processing for the current render output should be terminated.

If the host processor 1 has indicated that processing for the current render output should be terminated, then at step 1118, the firmware signals to hardware (e.g. the graphics processor 2) that processing for the current render output should be terminated. The hardware can then terminate processing for the current render output, and, e.g., begin processing the next render output.

If, however, it is determined at step 1117 that the host processor 1 has indicated that processing for the current render output can continue (should not be terminated), then at step 1119, it is determined whether the host processor 1 has responded by providing a newly set aside memory space chunk (or chunks). If it is determined that the host processor 1 has responded by providing a new memory space chunk (or chunks), then the firmware adds the newly provided memory space chunk (or chunks) to the available chunk list at step 1120. It will then be determined at step 1112 that there is now an available chunk in the available chunk list, and so the firmware provides the new chunk (or chunks) to the memory allocator 42 at step 1113, and removes it from the available chunk list at step 1114.

If, at step 1119, the host processor 1 has not provided a new memory space chunk, then this signifies that the host processor 1 has determined that vertex processing for the current render output should be paused until fragment processing is completed, and a previously used memory space chunk becomes available for recycling.

Thus, at step 1121 the firmware sets a flag indicating that vertex processing should be paused until fragment processing for a previous render output (which is using data stored in a previously used memory space chunk (or chunks)) has been completed. Then, when at step 1101, this fragment processing is completed and the memory space chunk (or chunks) becomes available, the memory space chunk (or chunks) is added to the available chunk list at step 1102.

The flag set at step 1121 can then be cleared at steps 1103 and 1104, and it will then be determined at step 1102 that there is now an available chunk in the available chunk list, and so the firmware provides the recycled chunk (or chunks) to the memory allocator 42 at step 1113, and removes it from the available chunk list at step 1114.

The process of FIG. 8 is performed by the host processor 1 in response to an out-of-memory signal received from the firmware (at step 1115 of FIG. 7). In the process of FIG. 8, the host processor 1 determines whether a new memory space chunk (or chunks) should be provided for use by the graphics processing pipeline, or whether vertex processing should be paused until fragment processing for a previous render output is completed, or whether processing for the current render output needs to be terminated.

Thus, as shown in FIG. 8, at step 1201, the host processor 1 receives an out-of-memory signal from the graphics processor (GPU) 2 firmware. At step 1202, the host processor 1 determines which linked list (heap) the out-of-memory signal has been sent for.

At step 1203, the host processor 1 determines the overall number of chunks that are currently set aside for use by the graphics processing pipeline 10, and whether or not the number of chunks is equal to a maximum number of chunks. The maximum number of chunks is a predetermined, hard limit on the number of chunks that the graphics processing pipeline 10 is allowed to use, e.g. so as to prevent the graphics processing pipeline 10 from using too much of the memory 6 to store vertex data and primitive lists.

If less than the maximum allowed number of chunks are being used, then at step 1204, the host processor 1 determines the number of render outputs for which fragment processing is currently pending, and whether or not the number of render outputs pending fragment processing is equal to a predetermined maximum. The maximum number of render outputs pending fragment processing is a predetermined, hard limit, e.g. so as to prevent vertex processing from getting too far ahead of fragment processing.

If, at step 1204, it is determined that the maximum allowed number of render outputs are pending fragment processing, then at step 1206, the host processor 1 responds to the firmware by providing a "null" chunk to the firmware which indicates that no additional memory space is to be provided, and that vertex processing should be paused until fragment processing is completed and a previously used chunk becomes available. This can then allow the fragment processing to "catch up" with the vertex processing.

If, at step 1204, it is determined that less than the maximum allowed number of render outputs are pending fragment processing, then at step 1207, the host processor 1 sets aside one or more new memory space chunks in memory 6, and responds to the firmware by providing the one or more new chunks to the firmware.

If, at step 1203, it is determined that the maximum allowed number of chunks are already in use, then the host processor 1 can either indicate that vertex processing should be paused until fragment processing for a previous render output has been completed and one or more previously used chunks become available, or terminate processing for the current render output.

Thus, at step 1205 the host processor 1 determines whether the graphics processing pipeline 10 is currently performing fragment processing for any previous render outputs, such that memory space chunks storing data for use in that fragment processing will become available once that fragment processing has been completed.

If, at step 1205, it is determined that there is pending fragment processing, then at step 1206, the host processor 1 responds to the firmware by providing a "null" chunk to the firmware which indicates that no additional memory space is to be provided, and that the vertex processing should therefore be paused until fragment processing is completed and a previously used chunk becomes available.

If, at step 1205, it is determined that there is no currently pending fragment processing, then at step 1208, the host 1 responds to the firmware by indicating that the processing of the current render output should be terminated.

FIG. 9 illustrates an example of the use of the above linked lists in more detail, according to an embodiment of the technology described herein.

In the present embodiment, when a render output (e.g. frame) (or a series of plural e.g. frames) is to be generated by the graphics processing system 100, a linked list of memory space chunks (a current chunk list) is provided for storing vertex data and primitive lists that the system needs to retain to generate the render output(s) (frame(s)).

FIG. 9A shows an example current chunk list in its initial state, which comprises three memory space chunks (Chunk 1, Chunk 2 and Chunk 3), according to the present embodiment. Fewer or more than three chunks could be initially present, if desired.

As discussed above, each chunk in the initial linked list comprises a set of contiguous memory addresses 511-513, and a pointer 521-523 linking the chunk in the linked list. The pointer 523 for Chunk 3 is null to indicate that Chunk 3 is the last chunk in the list. Each chunk also comprises further header information 531-533 comprising pointers pointing to the top and bottom memory addresses of the respective memory chunk.

As shown in FIG. 9A, the first and last chunk pointers 507, 508 in the tiler descriptor 501C are initially null, since there are initially no exhausted chunks storing data in the exhausted chunk list.

As also shown in FIG. 9A, the current chunk pointer 504 in the heap descriptor 501A initially points to the first chunk, Chunk 1, in the current chunk list. The memory allocator 42 will therefore begin allocating memory space for a render output from Chunk 1.

Thus, as data is generated by the graphics processing pipeline 10, memory space in the first chunk, Chunk 1, will be allocated to store that data. FIG. 9B illustrates the situation once Chunk 1 is full with data for the render output.

In the present embodiment, once a chunk is full with data for a render output (e.g. frame), it is moved from the current chunk list to the exhausted chunk list for that render output (e.g. frame) by updating pointers appropriately. Thus, as can be seen in FIG. 9B, in the present embodiment, the first and last chunk pointers 507, 508 in the tiler descriptor have been updated to point to Chunk 1, to signify that Chunk 1 is now in the exhausted chunk list. The pointer 521 for Chunk 1 has also be updated to be null, since Chunk 1 is now the last chunk in the exhausted chunk list.

As also shown in FIG. 9B, the current chunk pointer 504 in the current chunk list heap descriptor 501A has been updated to point to the next chunk in the current chunk list, Chunk 2. The memory allocator 42 will therefore continue allocating memory space for the render output from Chunk 2.

Figure 9C:
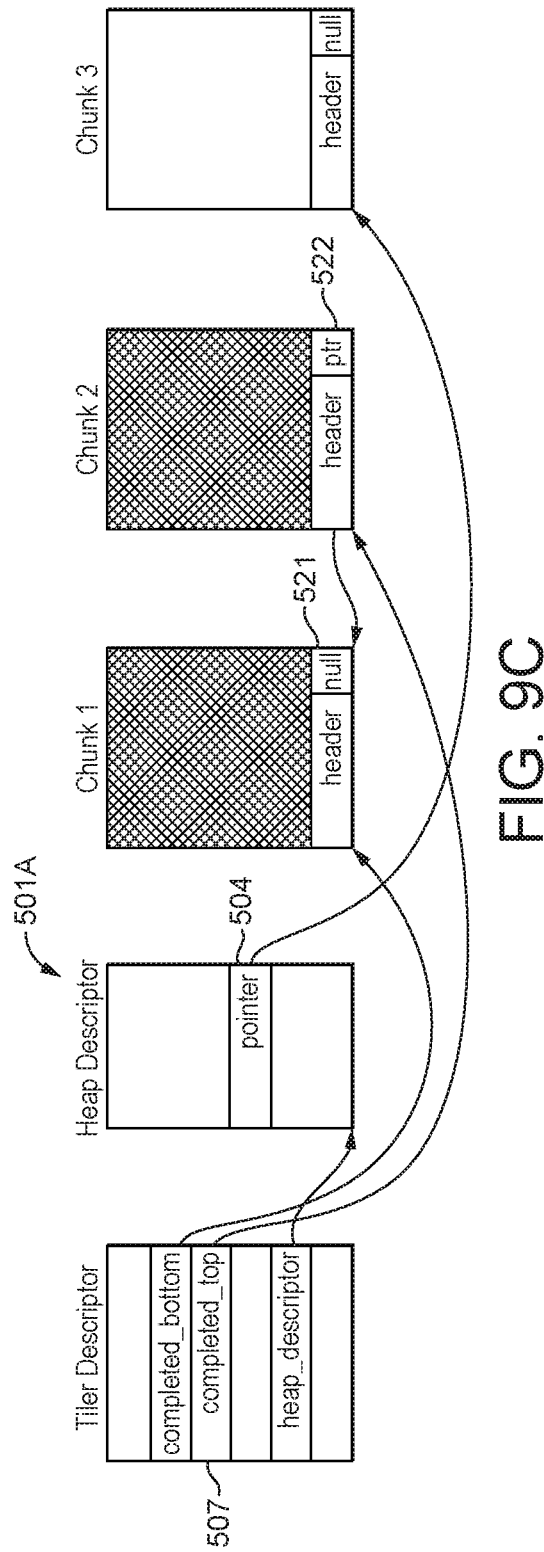

FIG. 9C illustrates the situation once Chunk 2 is full with data for the render output. As illustrated in FIG. 9C, Chunk 2 is now included in exhausted chunk list along with Chunk 1. To do this, Chunk 2 has been moved from the current chunk list to the beginning of the exhausted chunk list by updating the appropriate pointers: the first pointer 507 in the tiler descriptor now points to Chunk 2, and the pointer 522 for Chunk 2 now points to Chunk 1.

In this regard, the Applicants have recognised that if Chunk 2 were to be moved to the end of the exhausted chunk list, then an additional pointer update would be required. In particular, in addition to updating pointer 522 (to be null), the pointer 521 for Chunk 1 would need to be updated to point to Chunk 2. Thus, by adding a newly exhausted chunk to the beginning of the exhausted chunk list, the number of required pointer updates can be reduced, as compared to adding a newly exhausted chunk to the end of the exhausted chunk list.

As also shown in FIG. 9C, the current chunk pointer 504 in the current chunk list heap descriptor 501A has been updated to point to the next chunk in the current chunk list, Chunk 3. The memory allocator 42 will therefore continue allocating memory space for the render output from Chunk 3.

If Chunk 3 is then filled with data, an out-of-memory situation may arise, since Chunk 3 is the last chunk in the current chunk list. In the present embodiment, in response to such an out-of-memory situation, one or more memory space chunks are moved from the available chunk list to the end of the current chunk list to provide more memory space in the current chunk list.

Figure 9D:
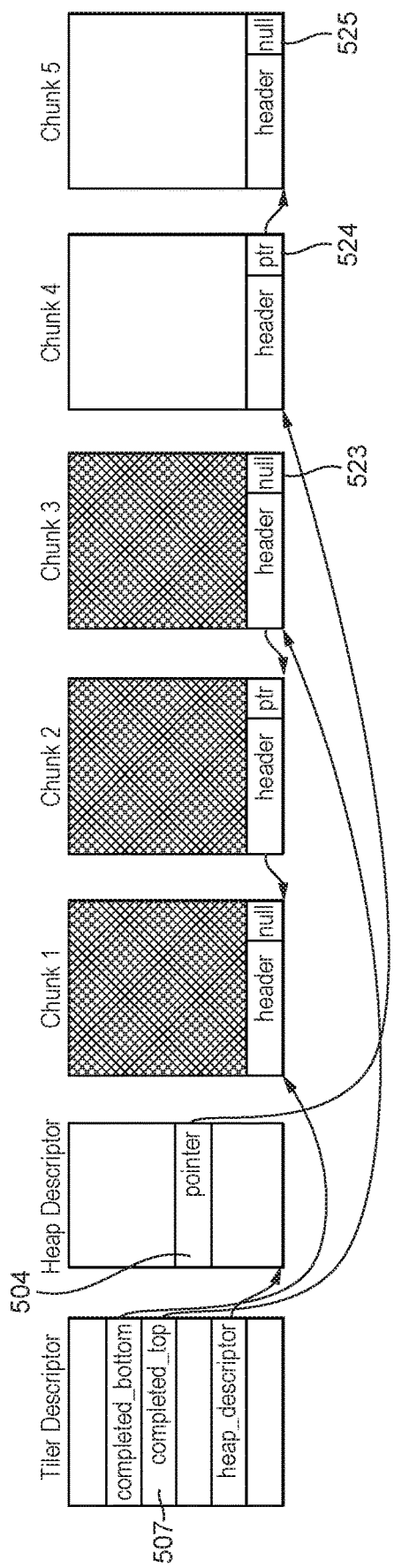

FIG. 9D illustrates the situation once Chunk 3 has been filled with data for the render output, and two additional memory space chunks, Chunk 4 and Chunk 5, have been moved from the available chunk list to the current chunk list.

As illustrated in FIG. 9D, newly exhausted Chunk 3 has been moved from the current chunk list to the beginning of the exhausted chunk list by updating pointers appropriately: the first pointer 507 in the tiler descriptor now points to Chunk 3, and the pointer 523 for Chunk 3 has been updated to point to Chunk 2.

As also illustrated in FIG. 9D, Chunks 4 and 5 have been included in the current chunk list by updating the current chunk pointer 504 to point to the first of the newly added chunks, Chunk 4, and by updating the pointers for Chunk 4 and Chunk 5 appropriately: Chunk 4 now comprises a pointer 524 pointing to Chunk 5, and Chunk 5 comprises a null pointer 525 to indicate that Chunk 5 is now the last chunk in the current chunk list.

The memory allocator 42 can therefore continue allocating memory space for the render output from Chunk 4.

Figure 9E:
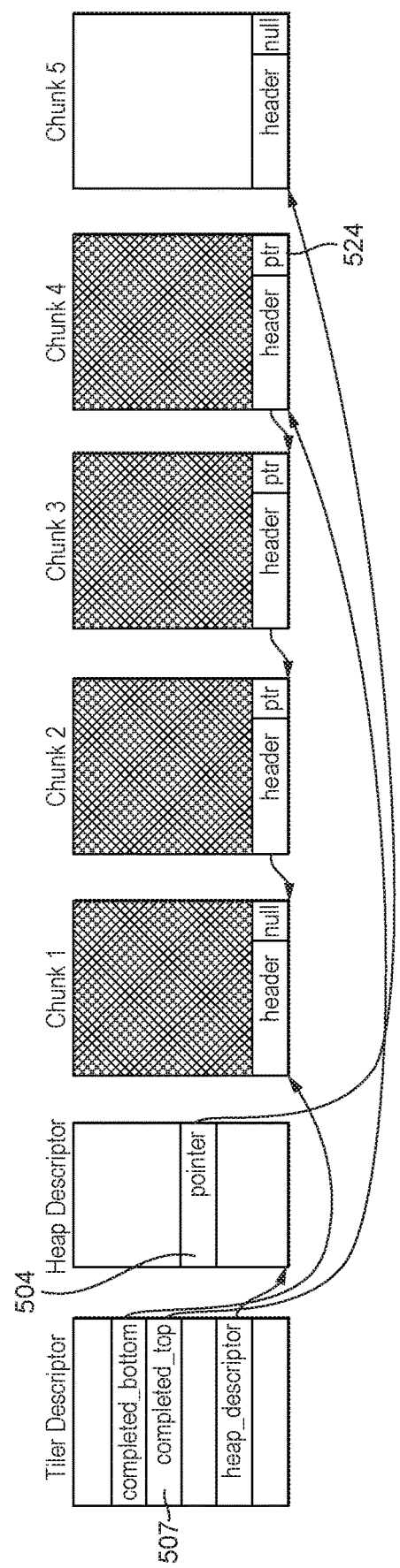

FIG. 9E illustrates the situation once Chunk 4 is full with data for the render output. As illustrated in FIG. 9E, newly exhausted Chunk 4 has been moved from the current chunk list to the beginning of the exhausted chunk list by updating the first pointer 507 in the tiler descriptor to point to Chunk 4, and updating the pointer 524 for Chunk 4 to point to Chunk 3.

Furthermore, as shown in FIG. 9E, the current chunk pointer 504 has been updated to point to the new current chunk, Chunk 5. The memory allocator 42 can therefore continue allocating memory space for the render output from Chunk 5.

In the present embodiment, Chunk 5 is then filled with the remaining vertex data and primitive lists that the graphics processing system requires for generating the render output, and is then moved to the exhausted chunk list, as discussed above.

Once all of the vertex data and primitive lists that the graphics processing system requires for generating the render output has been stored (in Chunks 1-5), the stored data can be provided for use in the fragment processing pass to generate the final render output (by passing the exhausted chunk list to the fragment shader).

Then, once the final render output has been generated, and the data stored in Chunks 1-5 for the render output is no longer needed by the system, Chunks 1-5 are moved from the exhausted chunk list to the available chunk list.

Chunks 1-5 will therefore be available to be "recycled" by the system when generating a subsequent render output.

This then means that rather than the host processor 1 needing to set aside a new heap of memory space in memory 6 for each and every render output that the graphics processing system generates, chunks of memory space that were previously set aside by the host processor 1 can be "recycled" and used for multiple different render outputs. As discussed above, this can simplify memory allocation and reduce the associated processing requirements.

Figure 10:
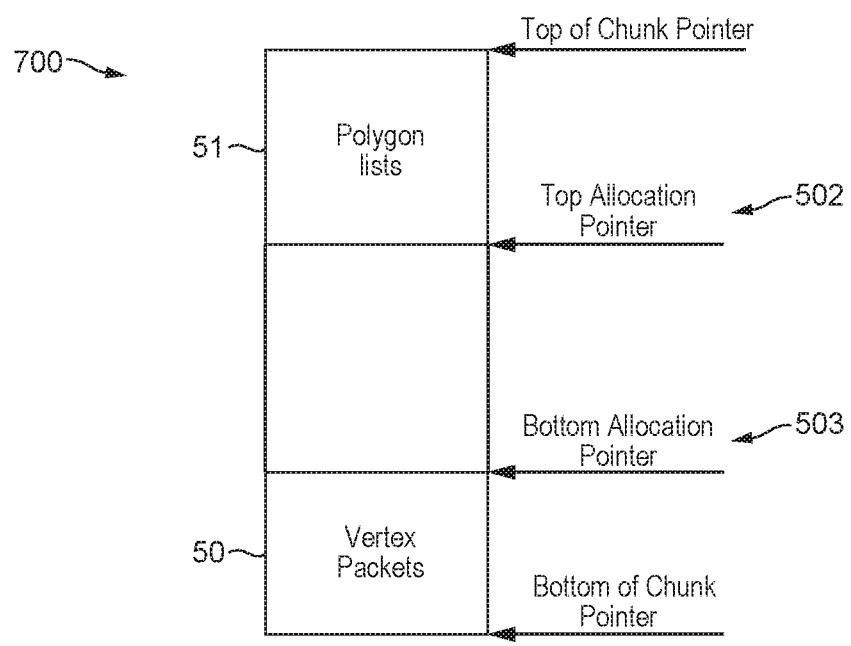
FIGS. 10, 11A, 11B, 12A, 12B and 12C show schematically the organisation of vertex data and primitive lists in a memory space chunk in an embodiment of the technology described herein.

FIGS. 10 to 12 illustrate the allocation of memory space for vertices and primitive (polygon) lists within a (the current) memory space chunk in more detail, in accordance with the present embodiment.

As shown in FIG. 10, in the present embodiment, polygon lists (primitive lists) are allocated from the top of a memory space chunk 700 and downwards, and vertices are allocated from the bottom up (and so use contiguous, increasing addresses for the vertices). Thus, as shown in FIG. 10, memory addresses from the top of the current memory chunk 700 down to the memory address indicated by the top allocation pointer 502 are used to stored polygon lists 51. Memory addresses from the bottom of the current memory chunk 700 up to the memory address indicated by the bottom allocation pointer 503 are used to store vertex data 50.

As shown in FIG. 10, the allocation of memory space within a memory space chunk 700 to vertices is performed by first allocating sub-blocks of memory space from the chunk ("vertex packets") that are each sufficient to store vertex shaded attribute data for plural vertices. Memory space within a vertex packet 50 in the memory space block is then allocated to individual vertices, until the vertex packet is full (at which point, if there is still space in the memory space block, a further vertex packet is allocated and then progressively filled with vertices, and so on, until there is no more space in the memory space block for a complete vertex packet).

Each sub-block (vertex packet) 50 is configured as described in US 2019/0012829. Thus, each sub-block (vertex packet) 50 is the same size, and is configured to be an integer number of cache lines, no matter the size of the vertex attributes. This means that the start of each new sub-block (vertex packet) will be cache-line aligned.

Figure 11A:
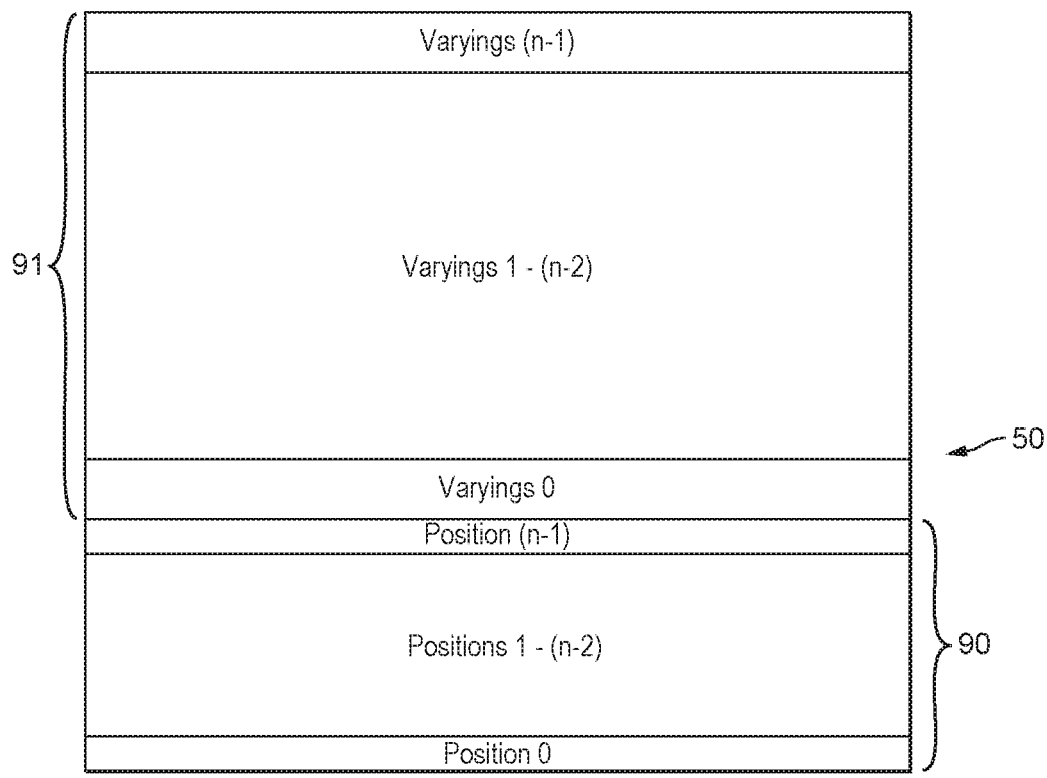
Figure 11B:
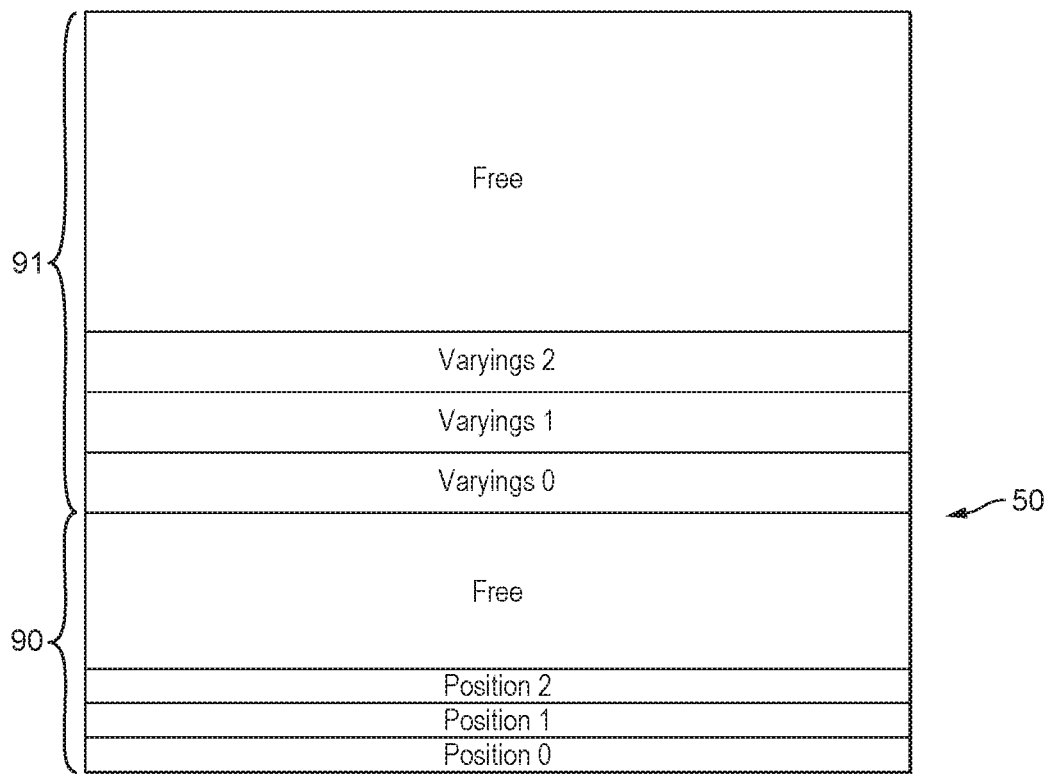

FIGS. 11A and 11B show the arrangement of vertex data within a vertex packet 50 in more detail. FIG. 11A shows a "full" vertex packet 50, and FIG. 11B shows a vertex packet 50 with free space in it (as it is being filled with vertex data).

As shown in FIGS. 11A and 11B, each vertex packet 50 can store attributes data for n vertices, and consists of (and stores) n positions 90 starting at offset "0" in the vertex packet (one for each of the n vertices in the packet), and then n sets of non-position attributes (varyings) starting at a position (offset) a×n bytes into the sub-block (packet) (i.e. starting at a position immediately after all the position data for all the n vertices has been stored) (where a is the number of bytes that the position attributes for a vertex will take up).

In the present embodiment, it is assumed that each cache line is 64-bytes and each vertex has 4×FP32 coordinates. Accordingly n is set to 64 so as to ensure that a vertex packet will always be an integer number of cache lines and a is set to 16.

Other arrangements would be possible.

Figure 12A:
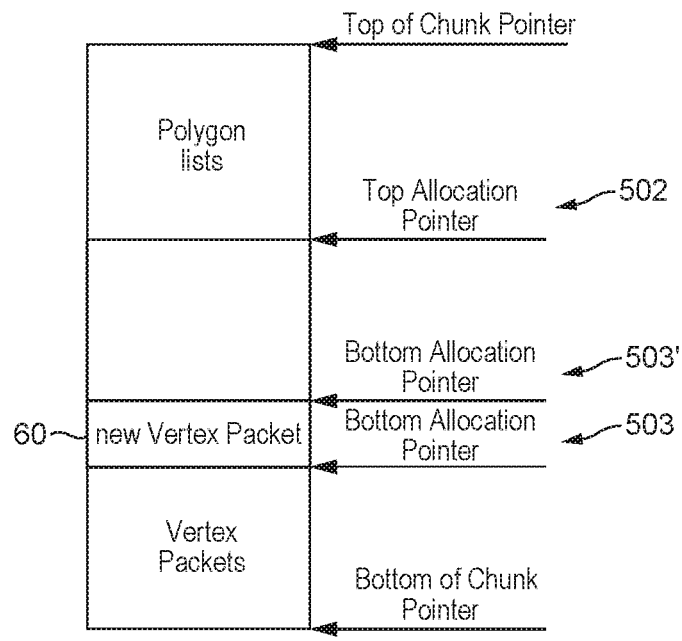

FIG. 12A illustrates the addition of a new vertex packet 60 from the bottom up in the current memory space chunk 700. In this case, the memory allocator 42 uses the bottom allocation pointer 503 to determine where in the memory space chunk 700 to begin allocating memory space for the new vertex packet 60 from. Then, once memory space has been allocated for storing the new vertex packet 60, the bottom allocation pointer 503 is updated (to pointer 503') to indicate where in the chunk 700 the allocation of memory space for the next new vertex packet should begin from.

Figure 12B:
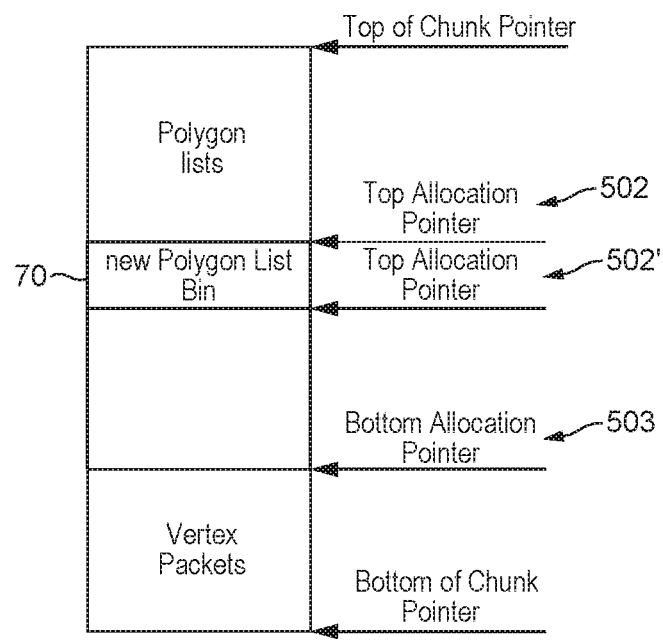

FIG. 12B correspondingly illustrates the addition of a new polygon (primitive) list bin 70 from the top down in the current memory space block 700. In this case, the memory allocator 42 uses the top allocation pointer 502 to determine where in the memory space chunk 700 to begin allocating memory space for the new polygon list 70 from. Then, once memory space has been allocated for storing the new polygon list 70, the top allocation pointer 502 is updated (to pointer 502') to indicate where in the chunk 700 the allocation of memory space for the next new polygon list should begin from.

Figure 12C:
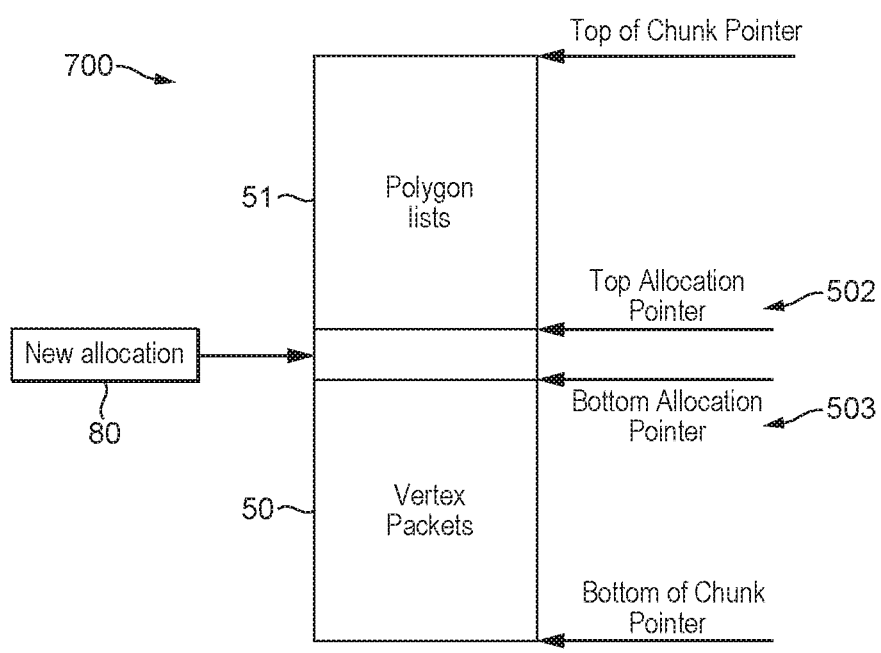

FIG. 12C shows the occurrence of an out-of-memory situation where a new memory space allocation (whether for a vertex packet or a polygon list bin) requires more room than is available in the current memory space chunk 700. This situation can be identified when the new memory space allocation 80 will move the corresponding top or bottom allocation pointer to overlap with the other of the top and bottom allocation pointers (thereby indicating an out-of-memory situation). In response to this, an appropriate "out-of-memory" operation is performed, as described above.

Although the above has been described with particular reference to storing vertex data generated by a vertex shading stage of a graphics processing pipeline for use by a later fragment shading stage of the graphics processing pipeline, in other embodiments, data generated by any processing stage of a graphics processing pipeline is stored for use by any later processing stage of the graphics processing pipeline.

Although the above has been described with particular reference to memory space blocks being arranged within (represented by) a linked list, in other embodiments, memory space blocks can be arranged in (represented by) any other suitable data structure, such as a tree structure.

It will be appreciated from the above that the technology described herein, in its embodiments at least, provides arrangements in which memory allocation for storing data for a graphics processing pipeline can be simplified, and the associated processing requirements reduced. This is achieved, in the embodiments of the technology described herein at least, by allocating memory space for storing data from a linked list of memory space chunks, and recycling memory space chunks when the data they store is no longer required by the graphics processing pipeline.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a graphics processor that executes a graphics processing pipeline comprising a vertex shading stage that is operable to perform vertex shading operations on vertices to generate vertex shaded attribute data for vertex attributes of the vertices, the method comprising:
   providing a set of blocks of memory space for storing vertex shaded attribute data generated by the vertex shading stage;
   the vertex shading stage performing a vertex shading operation on one or more vertices to generate vertex shaded attribute data for at least one attribute of the one or more vertices;
   allocating memory space for storing the vertex shaded attribute data from one of the blocks of memory space in the set of blocks of memory space; and
   storing the vertex shaded attribute data in the memory space allocated from the block of memory space in the set of blocks of memory space; the method further comprising:
   filling the block of memory space in the set of blocks of memory space from which memory space is allocated with data; and
   when the block of memory space in the set of blocks of memory space from which memory space is allocated has been filled with data:
      adding the block of memory space to a set of exhausted blocks of memory space; and
      processing data in the block of memory space added to the set of exhausted blocks of memory space; and
      when the data in the block of memory space has been processed:
         moving the block of memory space from the set of exhausted blocks of memory space to a set of available blocks of memory space.

2. The method of claim 1, wherein allocating memory space for storing the vertex shaded attribute data from one of the blocks of memory space in the set of blocks of memory space comprises:
   determining whether memory space should be allocated for the one or more vertices; and
   when it is determined that memory space should be allocated for the one or more vertices, allocating memory space for storing the vertex shaded attribute data.

3. The method of claim 1, wherein allocating memory space for storing the vertex shaded attribute data from one of the blocks of memory space in the set of blocks of memory space comprises:
   determining whether the set of blocks of memory space from which memory space is allocated does not have sufficient memory space available to store the vertex shaded attribute data; and
   when it is determined that the set of blocks of memory space from which memory space is allocated does not have sufficient memory space available to store the vertex shaded attribute data:
      adding a block of memory space to the set of blocks of memory space from which memory space is allocated; and
      allocating memory space for storing the vertex shaded attribute data from the block of memory space added to the set of blocks of memory space from which memory space is allocated.

4. The method of claim 3, wherein adding a block of memory space to the set of blocks of memory space from which memory space is allocated comprises:
   setting aside a new block of memory space; and
   adding the newly set aside block of memory space to the set of blocks of memory space from which memory space is allocated.

5. The method of claim 3, further comprising:
   wherein adding a block of memory space to the set of blocks of memory space from which memory space is allocated comprises:
   determining whether a block of memory space is available in the set of available blocks of memory space; and
   when it is determined that a block of memory space is available in the set of available blocks of memory space;
   moving a block of memory space from the set of available blocks of memory space to the set of blocks of memory space from which memory space is allocated.

6. The method of claim 5, further comprising:
   when it is not determined that a block of memory space is available in the set of available blocks of memory space:
      determining whether it is possible to suspend processing and wait for a block of memory space to become available; and
      when it is determined that it is possible to suspend processing and wait for a block of memory space to become available:
         suspending processing until a block of memory space becomes available; and then when the block of memory space becomes available:
            adding the newly available block of memory space to the set of blocks of memory space from which memory space is allocated; and
      when it is not determined that it is possible to suspend processing and wait for a block of memory space to become available:
         determining whether it is possible to set aside a new block of memory space; and
         when it is determined that it is possible to set aside a new block of memory space:
            setting aside a new block of memory space; and
            adding the newly set aside block of memory space to the set of blocks of memory space from which memory space is allocated.

7. The method of claim 1, wherein the graphics processing pipeline further comprises a fragment shading stage that is operable to process vertex shaded attribute data generated by the vertex shading stage that is stored in blocks of memory space; and wherein processing data stored in the block of memory space added to the set of exhausted blocks of memory space comprises
the fragment shading stage processing vertex shaded attribute data stored in the block of memory space.

8. The method of claim 1, comprising:
when the data stored in the block of memory space has been processed:
moving the block of memory space from the set of available blocks of memory space to the set of blocks of memory space from which memory space is allocated.

9. The method of claim 1, wherein the set of blocks of memory space from which memory space is allocated, the set of exhausted blocks of memory space and the set of available blocks of memory space are each provided in the form of a respective linked list of blocks of memory space.

10. A graphics processing system comprising:
a graphics processor comprising a vertex shading circuit operable to perform a vertex shading operation on one or more vertices to generate vertex shaded attribute data for at least one attribute of the one or more vertices; and
a memory space allocation circuit configured to:
allocate memory space for storing vertex shaded attribute data generated by the vertex shading circuit from a block of memory space in a set of blocks of memory space provided to the memory space allocation circuit; and to:
store vertex shaded attribute data generated by the vertex shading circuit in the allocated memory space from the block of memory space in the set of blocks of memory space; wherein the system is further configured to:
fill the block of memory space in the set of blocks of memory space from which memory space is allocated with data; and
when the block of memory space in the set of blocks of memory space from which memory space is allocated has been filled with data:
add the block of memory space to a set of exhausted blocks of memory space; and
process data in the block of memory space added to the set of exhausted blocks of memory space; and
when the data in the block of memory space has been processed:
move the block of memory space from the set of exhausted blocks of memory space to a set of available blocks of memory space.

11. The system of claim 10, wherein the system is further configured to:
determine whether the set of blocks of memory space from which memory space is allocated does not have sufficient memory space available to store the vertex shaded attribute data; and
when it is determined that the set of blocks of memory space from which memory space is allocated does have sufficient memory space available to store the vertex shaded attribute data:
add a block of memory space to the set of blocks of memory space from which memory space is allocated; and
allocate memory space for storing the vertex shaded attribute data from the block of memory space added to the set of blocks of memory space from which memory space is allocated.

12. The system of claim 11, wherein the system is configured to add a block of memory space to the set of blocks of memory space from which memory space is allocated by:

setting aside a new block of memory space; and
adding the newly set aside block of memory space to the set of blocks of memory space from which memory space is allocated.

13. The system of claim 11, wherein the system is configured to
add a block of memory space to the set of blocks of memory space from which memory space is allocated by:
determining whether a block of memory space is available in the set of available blocks of memory space; and
when it is determined that a block of memory space is available in the set of available blocks of memory space;
moving a block of memory space from the set of available blocks of memory space to the set of blocks of memory space from which memory space is allocated.

14. The system of claim 13, wherein the system is further configured to:
when it is not determined that a block of memory space is available in the set of available blocks of memory space:
determine whether it is possible to suspend processing and wait for a block of memory space to become available; and
when it is determined that it is possible to suspend processing and wait for a block of memory space to become available:
suspend processing until a block of memory space becomes available; and then when the block of memory space becomes available:
add the newly available block of memory space to the set of blocks of memory space from which memory space is allocated; and
when it is not determined that it is possible to suspend processing and wait for a block of memory space to become available:
determine whether it is possible to set aside a new block of memory space; and
when it is determined that it is possible to set aside a new block of memory space:
set aside a new block of memory space; and
add the newly set aside block of memory space to the set of blocks of memory space from which memory space is allocated.

15. The system of claim 10, wherein the graphics processor further comprises a fragment shading circuit that is configured to process vertex shaded attribute data generated by the vertex shading circuit that is stored in blocks of memory space; and the system is configured to:
process data stored in the block of memory space added to the set of exhausted blocks of memory space by
the fragment shading circuit processing vertex shaded attribute data stored in the block of memory space.

16. The system of claim 10, wherein the system is configured to:
when the data stored in the block of memory space has been processed:
move the block of memory space from the set of available blocks of memory space to the set of blocks of memory space from which memory space is allocated.

17. The system of claim 10, wherein the set of blocks of memory space from which memory space is allocated, the set of exhausted blocks of memory space and the set of available blocks of memory space are each provided in the form of a respective linked list of blocks of memory space.

18. A non-transitory computer readable storage medium storing software code which when executing on a processor performs a method of operating a graphics processor that executes a graphics processing pipeline comprising a vertex shading stage that is operable to perform vertex shading operations on vertices to generate vertex shaded attribute data for vertex attributes of the vertices, the method comprising:

providing a set of blocks of memory space for storing vertex shaded attribute data generated by the vertex shading stage;

the vertex shading stage performing a vertex shading operation on one or more vertices to generate vertex shaded attribute data for at least one attribute of the one or more vertices;

allocating memory space for storing the vertex shaded attribute data from one of the blocks of memory space in the set of blocks of memory space; and storing the vertex shaded attribute data in the memory space allocated from the block of memory space in the set of blocks of memory space; the method further comprising:

filling the block of memory space in the set of blocks of memory space from which memory space is allocated with data; and when the block of memory space in the set of blocks of memory space from which memory space is allocated has been filled with data:

adding the block of memory space to a set of exhausted blocks of memory space; and processing data in the block of memory space added to the set of exhausted blocks of memory space; and when the data in the block of memory space has been processed:

moving the block of memory space from the set of exhausted blocks of memory space to a set of available blocks of memory space.

\* \* \* \* \*

UNITED STATES PATENT AND TRADEMARK OFFICE
CERTIFICATE OF CORRECTION

PATENT NO. : 11,189,073 B2
APPLICATION NO. : 16/825346
DATED : November 30, 2021
INVENTOR(S) : Engh-Halstvedt et al.

Page 1 of 1

It is certified that error appears in the above-identified patent and that said Letters Patent is hereby corrected as shown below:

In the Claims

Column 42, Line 27 (Claim 5, Line 1) please delete "further comprising:"

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*